US012568140B2

(12) United States Patent
Lan et al.

(10) Patent No.: US 12,568,140 B2
(45) Date of Patent: Mar. 3, 2026

(54) USING VIRTUAL BUS TO FORM VIRTUAL NETWORK

(71) Applicant: HUAWEI TECHNOLOGIES CO., LTD., Shenzhen (CN)

(72) Inventors: Longwen Lan, Shanghai (CN); Zhuo Cheng, Zürich (CH); Zhen Cheng, Shanghai (CN); Wen Zhou, Shanghai (CN); Yi Su, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 4 days.

(21) Appl. No.: 18/606,527

(22) Filed: Mar. 15, 2024

(65) Prior Publication Data

US 2024/0223655 A1    Jul. 4, 2024

Related U.S. Application Data

(63) Continuation of application No. PCT/CN2022/110102, filed on Aug. 3, 2022.

(30) Foreign Application Priority Data

Sep. 17, 2021    (CN) .......................... 202111091182.4
Nov. 27, 2021    (CN) .......................... 202111426817.1

(51) Int. Cl.
*G06F 15/16*        (2006.01)
*H04L 12/40*        (2006.01)
*H04L 67/1097*      (2022.01)

(52) U.S. Cl.
CPC .... H04L 67/1097 (2013.01); H04L 12/40013 (2013.01); H04L 12/40104 (2013.01)

(58) Field of Classification Search
CPC ........... H04L 67/1097; H04L 12/40013; H04L 12/40104
See application file for complete search history.

(56) References Cited

U.S. PATENT DOCUMENTS

| | | | |
|---|---|---|---|
| 9,733,848 B2 * | 8/2017 | Gu | ....................... G06F 3/0665 |
| 9,930,115 B1 | 3/2018 | Wallner et al. | |
| 2012/0191834 A1 | 7/2012 | Song | |

(Continued)

FOREIGN PATENT DOCUMENTS

| | | |
|---|---|---|
| CN | 101753617 A | 6/2010 |
| CN | 106598498 A | 4/2017 |
| CN | 106686140 A | 5/2017 |

OTHER PUBLICATIONS

International Search Report and Written Opinion in International Appln. No. PCT/CN2022/110102, mailed on Oct. 25, 2022, 14 pages (with English translation).

(Continued)

*Primary Examiner* — Razu A Miah
(74) *Attorney, Agent, or Firm* — Fish & Richardson P.C.

(57) ABSTRACT

A data processing system in embodiments of this application includes a storage layer, a virtual bus, and a service layer. The storage layer includes a plurality of storage devices that are configured to provide storage space. The virtual bus is configured to receive registration of the plurality of storage devices to form a virtual network comprising the plurality of storage devices. The service layer is configured to provide a service for a user based on the virtual network.

18 Claims, 11 Drawing Sheets

(56)            References Cited

U.S. PATENT DOCUMENTS

| | | | |
|---|---|---|---|
| 2014/0059226 A1* | 2/2014 | Messerli | H04L 67/51 |
| | | | 709/226 |
| 2015/0261561 A1* | 9/2015 | Ashok | G06F 9/45558 |
| | | | 718/1 |
| 2016/0197995 A1* | 7/2016 | Lu | H04L 67/61 |
| | | | 709/219 |
| 2017/0070580 A1* | 3/2017 | Cardona-Gonzalez | |
| | | | H04L 67/10 |
| 2017/0134218 A1* | 5/2017 | Zhao | G06F 8/61 |
| 2017/0149737 A1 | 5/2017 | Betzler et al. | |
| 2017/0214550 A1* | 7/2017 | Kumar | H04L 41/5045 |
| 2018/0113640 A1* | 4/2018 | Fernandez | G06F 11/3419 |
| 2018/0167475 A1* | 6/2018 | Agarwal | H04L 63/101 |
| 2020/0285654 A1* | 9/2020 | Huang | H04L 67/1097 |
| 2021/0289026 A1* | 9/2021 | Gabrielson | G06F 9/541 |
| 2021/0400111 A1* | 12/2021 | Seltzer | H04L 67/1097 |
| 2022/0317981 A1* | 10/2022 | Yu | G06F 8/60 |
| 2022/0377112 A1* | 11/2022 | Iyer | H04L 63/105 |
| 2024/0223655 A1* | 7/2024 | Lan | H04L 65/1073 |

OTHER PUBLICATIONS

Extended European Search Report in European Appln. No. 22868881.
8, mailed on Sep. 17, 2024, 9 pages.

* cited by examiner

System 20

401

USING VIRTUAL BUS TO FORM VIRTUAL NETWORK

CROSS-REFERENCE TO RELATED APPLICATIONS

This application is a continuation of International Application PCT/CN2022/110102, filed on Aug. 3, 2022, which claims priority to Chinese Patent Application No. 202111091182.4, filed on Sep. 17, 2021, and Chinese Patent Application No. 202111426817.1, filed on Nov. 27, 2021. All of the aforementioned priority patent applications are hereby incorporated by reference in their entireties.

TECHNICAL FIELD

This application relates to the field of storage technologies, and in particular, to a data processing system, a data processing method, and a related apparatus.

BACKGROUND

With development of data storage technologies, more and more data can be stored in a plurality of storage devices. These storage devices may be distributed in different regions and different clouds (for example, different public clouds, different private clouds, or different hybrid clouds).

When the data needs to move between different storage devices, it is difficult for the data to move because the different storage devices have different organization forms and security management (for example, firewalls). In some solutions, the devices are connected to each other by establishing a site-to-site virtual private network (VPN) and a data buffer. However, a process of establishing the VPN and the data buffer is complex. Consequently, a use requirement of a user cannot be satisfied.

SUMMARY

Embodiments of this application provide a data processing system, a data processing method, and a related apparatus, so that devices can be connected to each other, and a requirement for data mobility between the devices is satisfied.

According to a first aspect, an embodiment of this application provides a data processing system, including a storage layer, a virtual bus, and a service layer. The storage layer includes a plurality of storage devices, and the storage layer is configured to provide storage space. The virtual bus is configured to receive registration of the storage devices to form a virtual network including the plurality of the storage devices. The service layer is configured to provide a service for a user based on the virtual network.

In this embodiment of this application, the registered storage devices may be connected to the virtual bus, and the storage devices are connected to each other based on the virtual bus, so that the plurality of devices can discover and communicate with each other without a direct interconnection therebetween. Services at the service layer may also be connected to the virtual bus, to implement services such as data mobility management and orchestration based on the virtual bus.

Further, the storage devices, the services, and the like connected to the virtual bus may be heterogeneous. For example, hardware models, software versions, vendors, locations, file systems, or the like of the storage devices may be different from each other, and content, forms, architectures, or the like of the services may be different from each other. The heterogeneous devices may also be connected to each other by using a layout specification provided by the virtual bus, to establish a loosely coupled and distributed data collaboration relationship.

Optionally, the plurality of storage devices may be centralized storage devices, may be distributed storage devices, may be virtual storage devices, or may be physical storage devices.

In a possible implementation of the first aspect, the plurality of storage devices include one or more of a storage array, a storage server, a public cloud, a private cloud, a hybrid cloud, or the like.

In a hybrid multi-cloud scenario, the user may have a plurality of storage devices, which may be distributed in different regions or in different clouds. However, in this embodiment of this application, the plurality of storage devices may be connected to each other through the virtual bus, to satisfy a connection requirement of the user for different storage devices.

In a possible implementation of the first aspect, one of the plurality of storage devices is configured to submit registration information to the virtual bus.

Correspondingly, the virtual bus may record the registration information of the storage device, to complete registration of the storage device.

Further, the virtual bus may provide a plurality of access points, and the storage device may perform device registration by using the access points. A registration service is decentralized and server-less because there are usually a plurality of access points and the access points are distributed in different areas. In addition, the storage device may alternatively select an access point that is close to the storage device or that satisfies a service requirement of the storage device to access the virtual bus, to improve registration efficiency of the storage device and improve a service that uses the virtual bus.

In a possible implementation of the first aspect, the registration information includes device information of the storage device (or referred to as configuration information of the storage device).

In a possible implementation of the first aspect, the registration information includes metadata of data.

In a possible implementation of the first aspect, the registration information includes information about a storage pool.

In a possible implementation of the first aspect, the registration information written into the virtual bus is written in a registration format. The registration format may be a data format that is predefined, preconfigured, or specified in a protocol, the registration format may be a data format defined by the virtual bus, or the registration format may be a data format obtained through negotiation between the virtual bus and the storage device.

For example, the data format may include a key-value format.

In a possible implementation of the first aspect, when information about the storage device is written in the registration format, there may be the following two possible designs.

Design 1: The storage device writes the registration information in the registration format.

Design 2: After the storage device uploads the registration information to the virtual bus, the registration information is converted into a unified format by using another service and written into the virtual bus.

In a possible implementation of the first aspect, one of the plurality of storage devices is configured to submit the registration information to the virtual bus after obtaining authorization.

In a possible implementation of the first aspect, in the plurality of storage devices, a transmit end is not directly connected to a receive end, and the transmit end and the receive end exchange data or transfer a message through the virtual bus.

In a possible implementation of the first aspect, the virtual bus further includes a message queue, and the message queue is used to store a message about any one of the storage devices.

In a possible implementation of the first aspect, the plurality of storage devices include the transmit end and the receive end. The message queue of the virtual bus is used to record a data push request from the receive end, and the data push request requests the transmit end to push target data. The transmit end is configured to push the target data to a preset location. The message queue of the virtual bus is further used to record a data preparation message related to the receive end, and the data preparation message notifies the receive end to fetch the target data.

According to a second aspect, an embodiment of this application provides a data processing method, including:

providing a storage layer, where the storage layer includes a plurality of storage devices, and the storage layer is configured to provide storage space;

providing a virtual bus, where the virtual bus is configured to receive registration of the storage devices to form a virtual network including the plurality of storage devices; and providing a service layer, where the service layer is configured to provide a service for a user based on the virtual network.

In this embodiment of this application, the registered devices may be connected to the virtual bus, and the storage devices are connected to each other based on the virtual bus, so that the plurality of devices can discover and communicate with each other without a direct interconnection therebetween. Services at the service layer may also be connected to the virtual bus, to implement services such as data mobility management and orchestration based on the virtual bus.

Further, the storage devices, the services, and the like connected to the virtual bus may be heterogeneous. For example, hardware models, software versions, vendors, locations, file systems, or the like of the storage devices may be different from each other, and content, forms, architectures, or the like of the services may be different from each other. The heterogeneous devices may also be connected to each other by using a layout specification provided by the virtual bus, to establish a loosely coupled and distributed data collaboration relationship.

Optionally, the plurality of storage devices may be centralized storage devices, may be distributed storage devices, may be virtual storage devices, or may be physical storage devices.

In a possible implementation of the second aspect, the plurality of storage devices include one or more of a storage array, a storage server, a public cloud, a private cloud, a hybrid cloud, or the like.

In a hybrid multi-cloud scenario, the user may have a plurality of storage devices, which may be distributed in different regions or in different clouds. However, in this embodiment of this application, the plurality of storage devices may be connected to each other through the virtual bus, to satisfy a connection requirement of the user for different storage devices.

In a possible implementation of the second aspect, the method further includes: One of the plurality of storage devices submits registration information to the virtual bus.

Correspondingly, the virtual bus may record the registration information of the storage device, to complete registration of the storage device.

Further, the virtual bus may provide a plurality of access points, and the storage device may perform device registration by using the access points. A registration service is decentralized and server-less because there are usually a plurality of access points and the access points are distributed in different areas. In addition, the storage device may alternatively select an access point that is close to the storage device or that satisfies a service requirement of the storage device to access the virtual bus, to improve registration efficiency of the storage device and improve a service that uses the virtual bus.

In a possible implementation of the second aspect, the registration information includes device information of the storage device (or referred to as configuration information of the storage device).

In a possible implementation of the second aspect, the registration information includes metadata of data.

In a possible implementation of the second aspect, the registration information includes information about a storage pool.

In a possible implementation of the second aspect, the registration information written into the virtual bus is written in a registration format. The registration format may be a data format that is predefined, preconfigured, or specified in a protocol, the registration format may be a data format defined by the virtual bus, or the registration format may be a data format obtained through negotiation between the virtual bus and the storage device.

For example, the data format may include a key-value format.

In a possible implementation of the second aspect, when information about the storage device is written in the registration format, there may be the following two possible designs.

Design 1: The storage device writes the registration information in the registration format.

Design 2: After the storage device uploads the registration information to the virtual bus, the registration information is converted into a unified format by using another service and written into the virtual bus.

In a possible implementation of the second aspect, the method further includes: One of the plurality of storage devices submits the registration information to the virtual bus after obtaining authorization.

In a possible implementation of the second aspect, in the plurality of storage devices, a transmit end is not directly connected to a receive end, and the transmit end and the receive end exchange data or transfer a message through the virtual bus.

In a possible implementation of the second aspect, the virtual bus further includes a message queue, and the message queue is used to store a message about any one of the storage devices.

In a possible implementation of the second aspect, the plurality of storage devices include the transmit end and the receive end, and the method further includes:

recording, by the virtual bus by using the message queue, a data push request from the receive end, where the data push request requests the transmit end to push target data;

pushing, by the transmit end, the target data to a preset location; and recording, by the virtual bus by using the message queue, a data preparation message related to the receive end, where the data preparation message notifies the receive end to fetch the target data.

According to a third aspect, an embodiment of this application provides a computing node. The computing node includes a processor and a memory. The memory stores at least one computer instruction. The instruction is loaded and executed by the processor, to implement the method operation performed by the virtual bus in any implementation of the second aspect.

According to a fourth aspect, an embodiment of this application provides a storage device. The storage device includes a processor and a memory. The memory stores at least one computer instruction. The instruction is loaded and executed by the processor, to implement the method operation performed by the storage layer in any implementation of the second aspect.

According to a fifth aspect, an embodiment of this application provides a computer-readable storage medium. The computer-readable storage medium stores instructions. When the instructions are run on at least one processor, the method according to any one of the implementations of the second aspect is implemented.

According to a sixth aspect, this application provides a computer program product. The computer program product includes computer instructions. When the instructions are run on at least one processor, the method according to any one of the implementations of the second aspect is implemented.

Optionally, the computer program product may be a software installation package. When the foregoing method needs to be used, the software installation package may be downloaded, and computer instructions formed by the software installation package may be executed on a computing device.

For beneficial effects of the technical solutions provided in the second aspect to the fifth aspect in this application, refer to beneficial effects of the technical solution in the first aspect. Details are not described herein again.

BRIEF DESCRIPTION OF DRAWINGS

The following briefly describes the accompanying drawings used for describing embodiments.

6

Figures 7, 8:
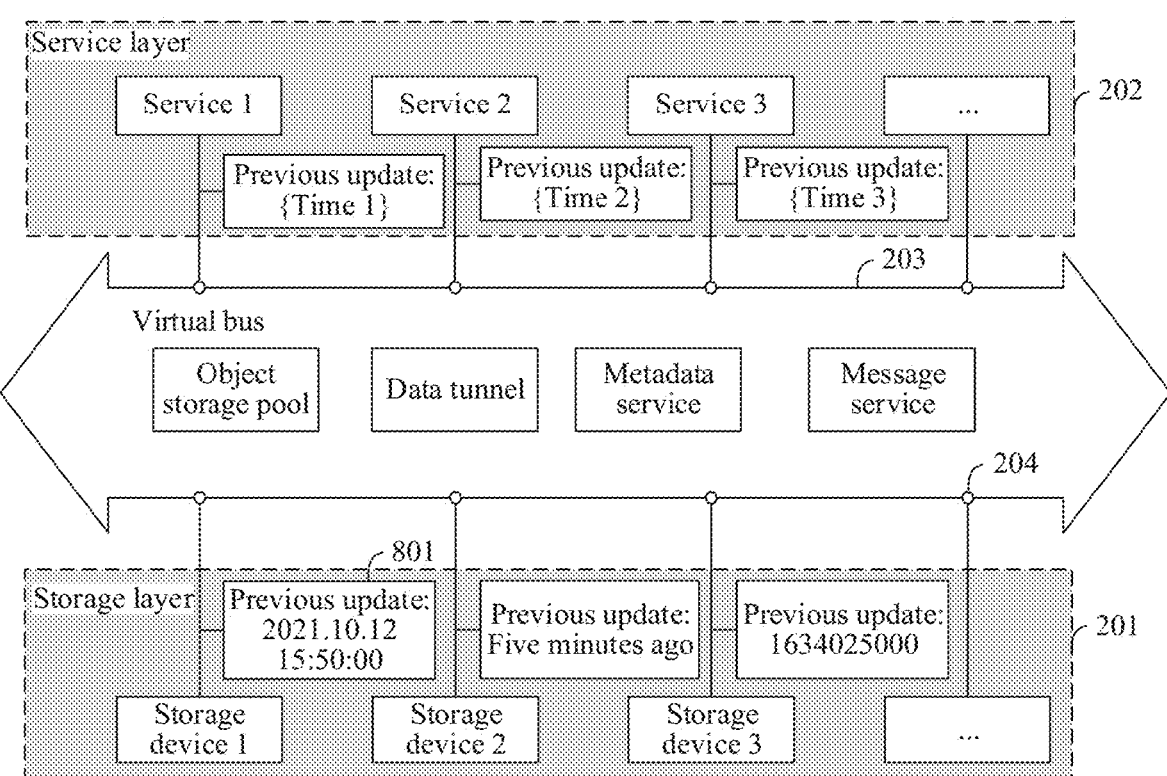
FIG. 7 is a schematic diagram of a device directory of a virtual bus according to an embodiment of this application.
Figure 9:
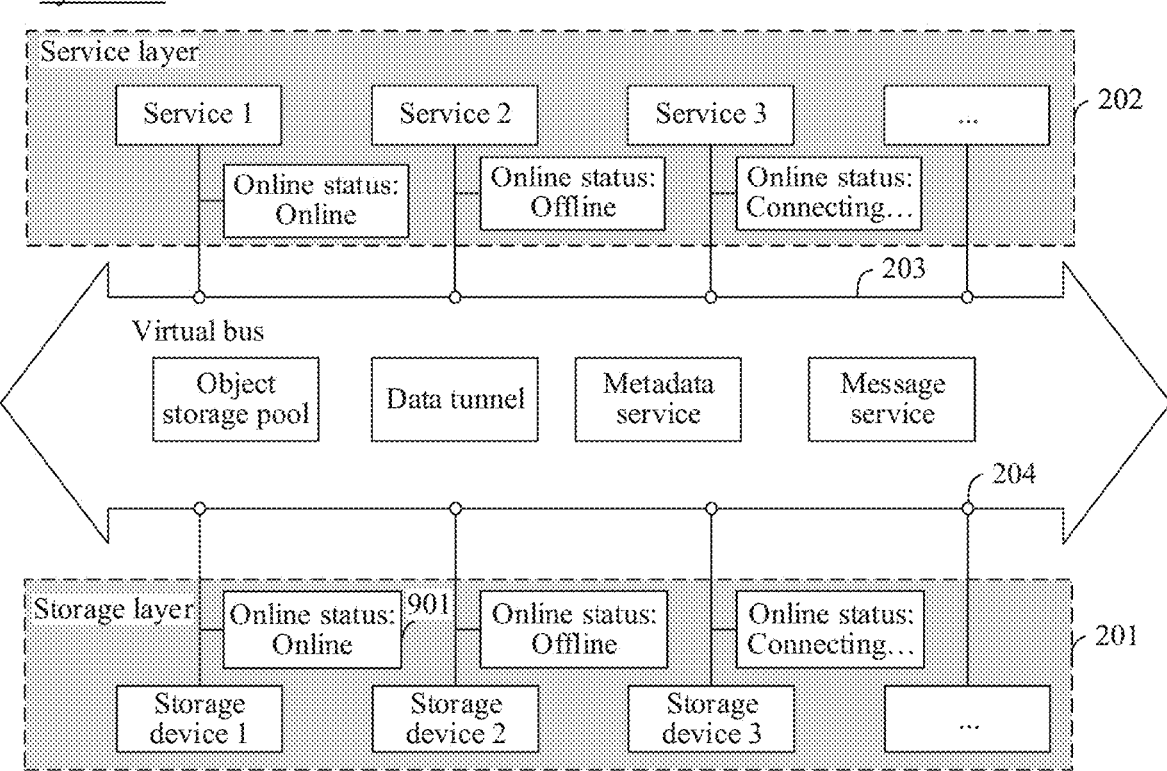
Figure 10:
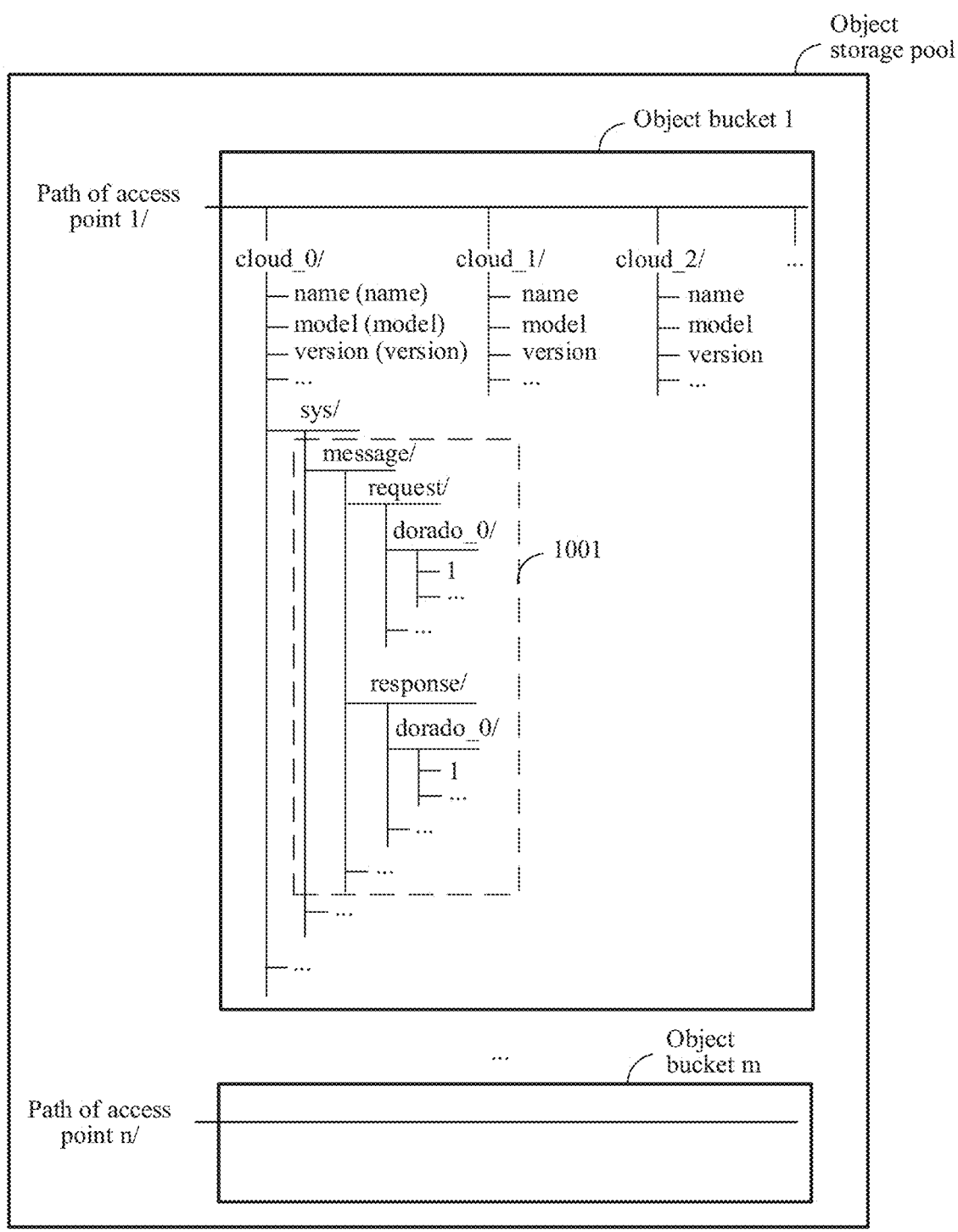
Figure 11:
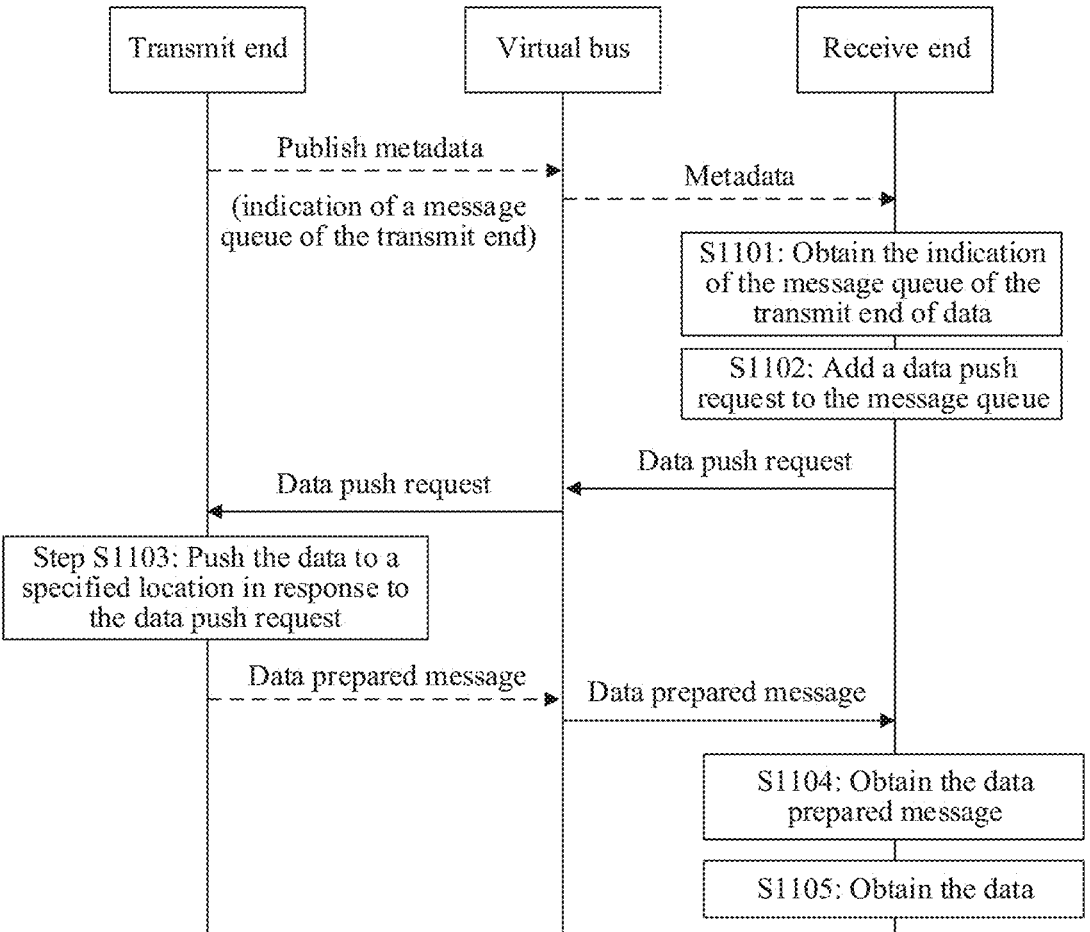
Figure 12:
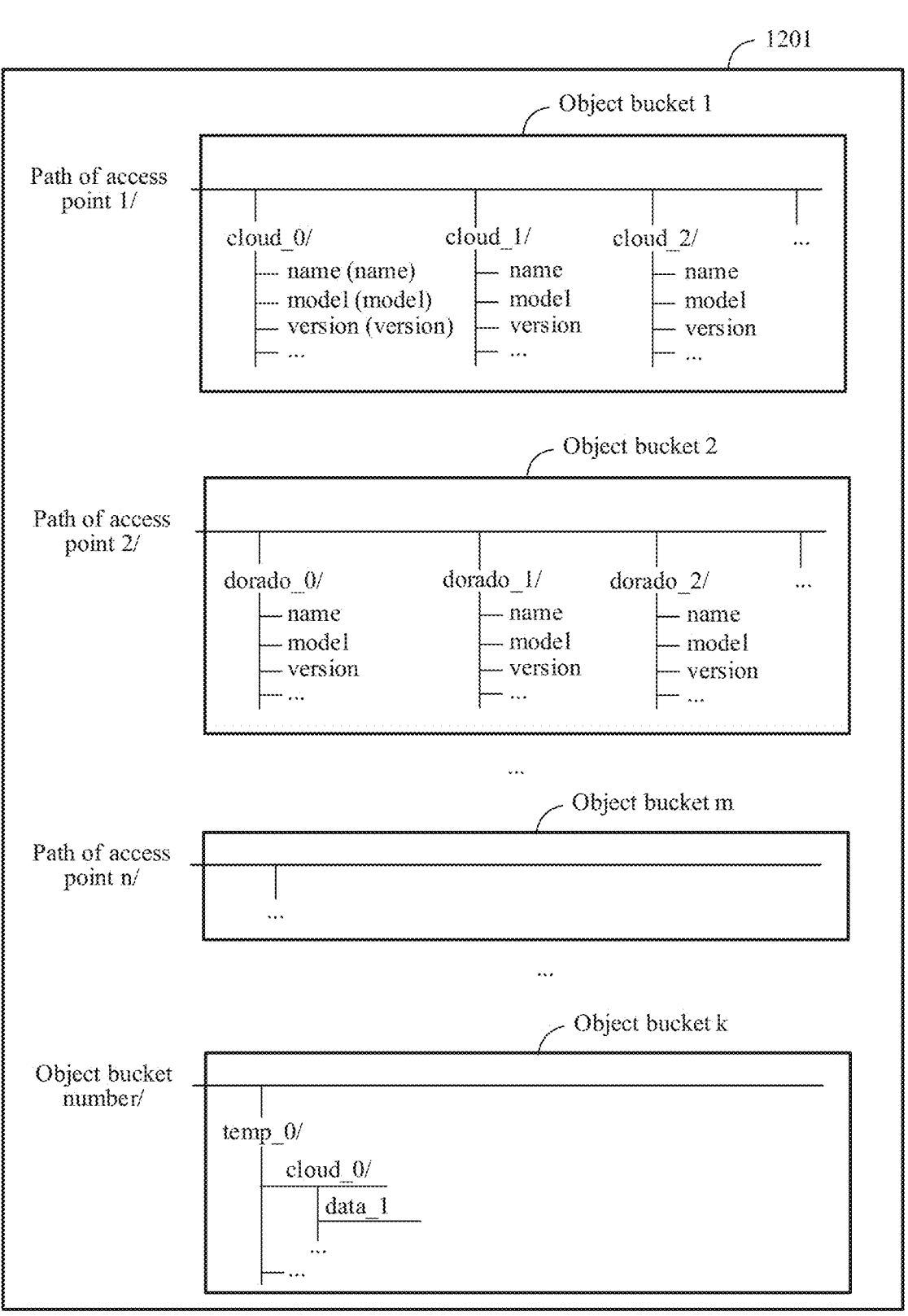
Figure 13:
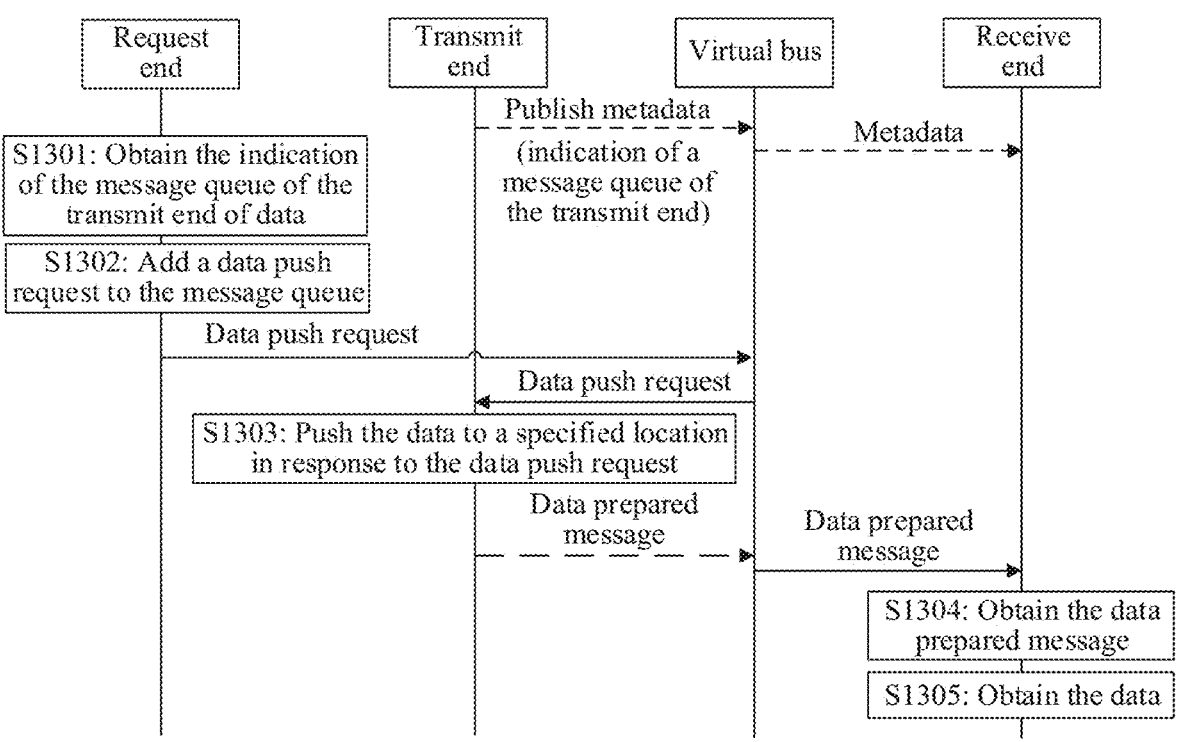
Figure 14:
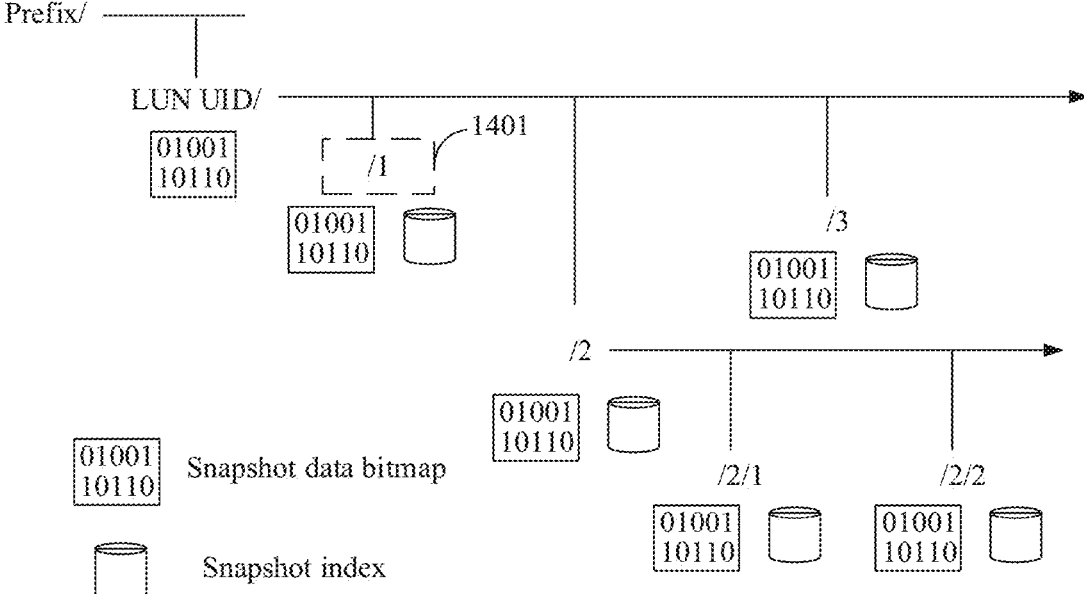

FIG. 8 is a schematic diagram of an online status according to an embodiment of this application;

FIG. 9 is a schematic diagram of another online status according to an embodiment of this application;

FIG. 10 is a schematic diagram of a directory of content stored in a storage pool according to an embodiment of this application;

FIG. 11 is a schematic flowchart of a data processing method according to an embodiment of this application;

FIG. 12 is a schematic diagram of a directory of another object storage pool according to an embodiment of this application;

FIG. 13 is a schematic flowchart of another data processing method according to an embodiment of this application; and FIG. 14 is a schematic diagram of mapping a block to an object according to an embodiment of this application.

DESCRIPTION OF EMBODIMENTS

The following describes in detail embodiments of this application with reference to the accompanying drawings.

For ease of understanding, the following describes, by using examples, some concepts related to embodiments of this application for reference. Descriptions are as follows.

1. Object Storage Service

The object storage service is an object-based storage service. One object includes data of a file and attribute information related to the file. The object storage service is usually provided by a service provider. For example, the service provider may include Huawei, Amazon, Alibaba, or Microsoft.

The object storage service (OBS) of Huawei Cloud is used as an example. The OBS includes an object and a bucket.

The object includes one or more of data, metadata, a key, or the like. The data is data content of a file. The key may be regarded as an identifier of the object (or a name of the object). Each object in one bucket usually has a unique key. The metadata is description information of the object, and usually exists in a form of a key-value pair (Key-Value).

The bucket is a container for storing the object. The bucket includes attributes such as an access domain name, a storage class, an access permission, and a region to which the bucket belongs. A user of the object storage service can access the bucket based on the access domain name of the bucket.

2. Message Queue

The message queue is a communication mode, and may be understood as a list including one or more messages. A message is stored in the message queue before the message is processed and deleted. A message sender may interact with a message receiver by using a message queuing service. It should be understood that, for ease of description, in this application, a data structure including a plurality of messages is referred to as a message queue, and is not intended to limit implementation of the message queue in a queue manner. For example, in a specific implementation process, the message queue may alternatively be implemented by using a list, a heap, a linked list, a stack, or the like.

In a design, a device may obtain, by periodically or aperiodically reading (or listening to) the message queue, a message that needs to be processed by the device.

In another design, the message may be notified to the receiver by using the message queuing service. After the message sender (or a message initiator) writes the message into the message queue, the message queuing service may notify the receiver to process the message. For example, a doorbell mechanism is used to remind the receiver to read the message.

The message queue is applicable to a server-less architecture and a microservice architecture, and is also applicable to a server architecture.

3. User

The user is an individual or organization having an independent resource (for example, one or more of a computing resource, a storage resource, or a network resource). In some scenarios, the user may also be referred to as a tenant or a member.

4. Redirect

Redirect refers to a process of determining a request direction of a network request and forwarding the network request to another location for processing.

For example, due to adjustment of network resources, content that is originally at an address 1 is migrated to an address 2. In this case, access of the user to the address 1 may be redirected, to be specific, access of the user to the address 1 is redirected to the address 2, so that the user may access required content.

Redirection may be implemented by using a method such as 301 redirect, 302 redirect, or meta fresh.

5. Logical Unit Number (LUN)

The LUN is division of a storage unit, and may specifically include a number, a symbol, a character string, and the like.

In some storage systems, for example, in a storage area network (SAN), the LUN identifies a logical unit. To be specific, the storage system partitions a physical hard disk into parts that have logical addresses, and allows the user to access the storage system. Such a partition is referred to as a LUN.

In some scenarios, the LUN also refers to a logical disk created on a SAN storage.

The foregoing descriptions of the concepts by using examples may be used in the following embodiments.

Devices often need to communicate with each other, for example, data migration, data push, data reading, or data writing between storage devices. However, a transmit end and a receive end of the communication may be distributed in different regions or different clouds (for example, different public clouds, different private clouds, or different hybrid clouds). In this case, the transmit end and receive end cannot be directly accessed via an internet. As a result, the devices cannot communicate with each other, and data cannot move.

For example, in a hybrid multi-cloud scenario, a user may have a plurality of storage devices and/or a plurality of services. These storage devices (and/or services) may be located offline in different regions, and may be distributed online in different clouds. A communication connection cannot be established due to a communication area restriction, security control, or the like.

Figure 1:
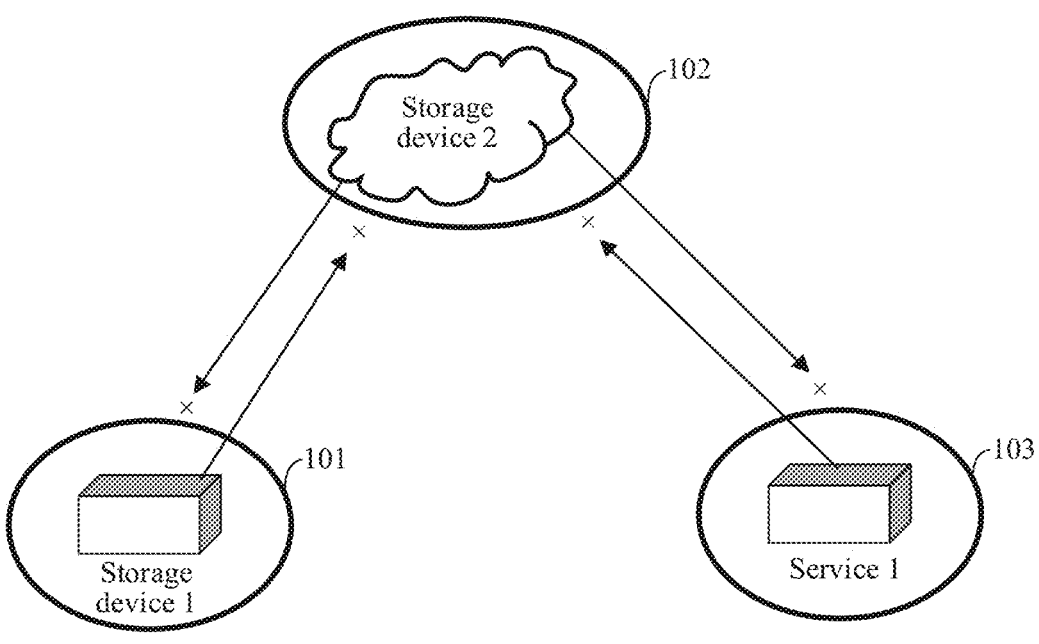
FIG. 1 is a schematic diagram of a data mobility scenario according to an embodiment of this application.

FIG. 1 is a schematic diagram of a possible data mobility scenario according to an embodiment of this application. A storage device 1 is located behind a firewall 101, a storage device 2 is located behind a firewall 102, and a service 1 is located behind a firewall 103. Because the storage device 1 and the storage device 2 are located in different firewalls, if the storage device 1 initiates a request (for example, a connection request or a data mobility request) to the storage device 2, the request is rejected by the firewall 102 of the storage device 2. Correspondingly, if the storage device 2 initiates a request to the storage device 1, the request is rejected by the firewall 101 of the storage device 1. Therefore, a connection cannot be established between the storage device 1 and the storage device 2. Consequently, it is difficult for data to move between the storage device 1 and the storage device 2. Similarly, a connection and data mobility between the service 1 and the storage device 2 are also restricted by the firewall 103 and/or the firewall 102.

In a possible scenario, the storage device 1 is a data center of an enterprise A, and stores a large amount of service data. The storage device 2 is a public cloud virtual machine purchased by the enterprise A. The enterprise A needs to push service data in the storage device 1 to a public cloud for data analysis. Because the connection cannot be established between the storage device 1 and the storage device 2, the service data in the storage device 1 cannot be pushed to the public cloud. Consequently, a data mobility requirement of the enterprise A cannot be satisfied.

Further, the service 1 may be a data management service in a private cloud established by the enterprise A. Because the service 1 is located behind the firewall 103, a service usage requirement of the enterprise A cannot be satisfied.

In view of this, embodiments of this application provide a data processing system, a data processing method, and a related device, so that devices can be connected to each other, and a requirement for data mobility between the devices is satisfied.

Figure 2:
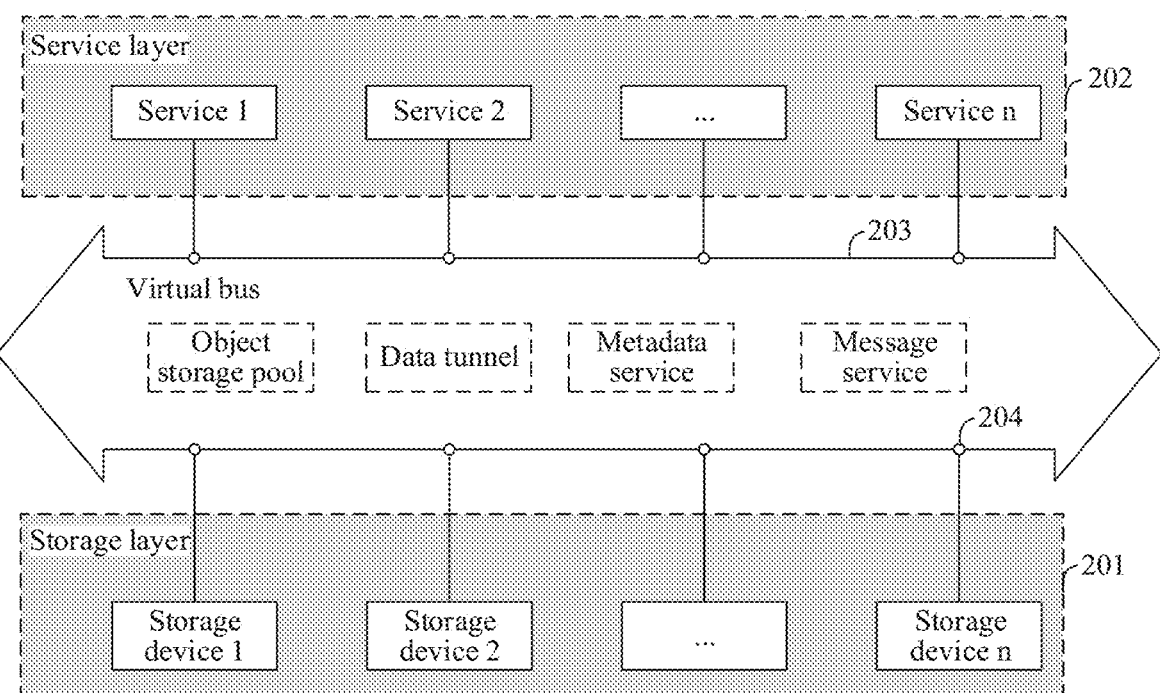
FIG. 2 is a schematic diagram of a data processing system according to an embodiment of this application.

FIG. 2 is a schematic diagram of a possible data processing system 20 according to an embodiment of this application. Refer to FIG. 2. The data processing system 20 may include a storage layer 201, a virtual bus 203, and a service layer 202.

(1) The storage layer 201 includes one or more storage devices, and the storage layer is configured to provide storage space.

The storage device is an apparatus configured to provide the storage space. An organization form (for example, centralized or distributed), an existence form (for example, a physical apparatus or a virtual apparatus), a storage space size, a location, a provider, and the like of the storage device are not limited in this application.

For example, the storage device may include a centralized storage device, for example, a storage array or a storage server, or may include a public cloud, a private cloud, a hybrid cloud, or a part or all of storage space in a cloud.

For example, the storage device may include a physical apparatus, for example, a solid-state drive, a mechanical hard disk, a storage device of a storage medium of another type, or a storage server, or may include a virtual apparatus, for example, a container, a virtual machine, or a storage pool obtained by performing virtualization processing on the physical apparatus.

(2) The service layer 202 may contain one or more services. The services are resources provided by a service provider or a series of activities completed on the resources. These resources or activities can solve a user problem or satisfy a user requirement.

For example, the services herein may include the following categories.

Category 1: Resources. For example, the services include resources such as a storage resource (for example, an object storage service), a computing resource (for example, an elastic cloud server and a cloud mobile phone), and a network resource (for example, a virtual private cloud or elastic load balance).

Category 2: Activities performed on the resources. Further, these services may include a basic service, a management service, a user-oriented service, and the like.

The basic service is a service on which the virtual bus depends. The virtual bus maintains operation based on the basic service. The basic service may include, for example, a security service, a message queuing service, and the like.

The management service is used to manage the virtual bus or a service of managing a user of the virtual bus, for example, a data query service, a data view service, a data mobility orchestration and management service, an identity authentication service, a cloud supervision service, or a cloud audit service.

The user-oriented service may include, for example, a registration service, a data processing service (for example, data query, data analysis, or big data insight), a software development platform service (for example, a development platform, project management, project deployment, code hosting, or an image service), an artificial intelligence service (for example, natural language processing, content review, or image recognition), and an application running service (for example, a cloud performance test service).

Category 3: Software registered by the user in the virtual bus. For example, the user may register a data analysis software developed by the user with the virtual bus to form a service.

It should be understood that the foregoing service categories are merely examples, and in a specific implementation process, the service layer may include more or fewer service categories.

Some of the services at the service layer can be provided to the user in a payment mode. For example, some of the services at the service layer may be value-added services oriented to the user, for example, the identity authentication service or the cloud supervision service.

It should be understood that a quantity of storage devices at the storage layer, a quantity of services at the service layer, a quantity of connection points, and the like shown in FIG. 1 are merely examples, and do not limit the data processing system in this application. In an implementation process, there may be one or more storage devices, services, connection points, or the like.

(3) The virtual bus 203 may also be referred to as a virtual bus layer or an intermediate layer. A user of the virtual bus is a device (for ease of description, a device for short) connected to the bus, for example, one or more of the storage devices at the storage layer, the services at the service layer, or the like.

The virtual bus may receive a registration (or publication, referred to as a registration hereinafter for ease of description) of a device, to form a virtual network including a plurality of devices. The registered device may be discovered by another device. Correspondingly, the user of the virtual bus may discover another device through the virtual bus, to implement interconnection between the devices.

The following describes how the device registers with the virtual bus.

First, the device submits registration information to the virtual bus for device registration. The registration information describes a configuration of the device, data stored in the device, a type of a service provided by the device, or the like.

For example, the registration information includes one or more of information such as configuration information of the device, metadata of the data stored in the device, or a storage pool of the device. The configuration information includes one or more of an identifier (ID, for example, a universally unique identifier (UUID)), a name, a model, a version number, a geographical region (which may be, for example, West China, Central China, or North China), a location (which may be a city name, a building name, an equipment room number, a rack number, or the like, or described by using longitude and latitude), a (physical) address, an internet protocol (IP) address, a media access control (MAC) address, a port number, a management IP, an application programming interface (API), or the like. The device may be managed by a management device or managed through a management port, and the management IP is an IP address of the management device or the management port.

For example, the metadata of the data may include one or more of information about a storage pool in which the data is located, a LUN corresponding to the data, information about a file system, information about a directory shared to a global file system, mounted directory information from other devices, status information (for example, an online status, a fault status, space usage, and the like of a file system in which the data is located), a name of the data, a sharing address (where if the data is shared, another device may access the data based on the sharing address), a license, or the like. The sharing address may include an IP address, a MAC address, a uniform resource locator (URL) address, or the like. For example, the information about the storage pool includes one or more of an identifier of the storage pool, an identifier of a hard disk included in the storage pool, free storage space in the storage pool, a capacity of the storage pool, a minimum access unit, and the like. Optionally, the storage pool may be obtained through virtualization. For example, a tenant may rent storage space from a storage service provider, and the information about the storage pool is obtained by virtualizing the storage space.

The virtual bus includes one or more access points, as indicated by round points 204 shown in FIG. 2. The access point is a path through which the device accesses the virtual bus. Specifically, the path, which may also be referred to as a resource address, indicates a location of the access point, and the device may find the access point through the path. Optionally, the path may be a URL, for example, https:// virtualbus.s3.cn north 1.amazonaws.com.cn. Alternatively, optionally, when the access point is an object bucket (a container storing an object), the path of the access point is a directory of the bucket.

There may be one or more types of access points in this application. For example, the access point may include two types of access points: a basic access point and a derivative access point. A path of the basic access point is consistent with an address (referred to as an access address below) that the user requests to access, but a path of the derivative access point is inconsistent with the access address.

In a design, when a virtual device accesses the basic access point, the user may be redirected to the derivative access point by using a redirection mechanism, so that a new access point may be used on the basis of the basic access point, to obtain an access point network. By using the derivative access point, a quantity of access points can be adjusted, and elasticity of the system can be improved. In addition, some basic access points may be unavailable due to faults, service adjustment, or the like. When the access point accessed by the device cannot be used, the access of the device may be redirected to another available access point by using the redirection mechanism, to adapt to a change of the access point and improve flexibility and stability of the system.

One or more access points are disposed in the virtual bus, and the device has a bus connector (or another functional unit that can access the access point, which is described in detail below). The device writes the registration information into a path corresponding to the access point by using the bus connector, that is, the device may be connected to the virtual bus. Because there are usually a plurality of access points and the access points are distributed in different areas, a registration process of the device may be decentralized and server-less. In addition, the device may further access the virtual bus by using an access point that is close to the device or that satisfies a service requirement of the device, to improve registration efficiency of the storage device and improve experience of using the virtual bus.

An access point has its own information to describe the access point. In this embodiment, the information is referred to as information about the access point. The information about the access point includes an access address, a number, a region, a provider, and the like of the access point.

During registration, the device may obtain information about a plurality of access points, and write the registration information into one or more of the access points, to implement registration of the device with the virtual bus. A storage form of the information about the access point is not limited in this application. For example, the information about the access point may be provided to the device in a form of a queue, a table, or the like. Table 1 shows a list of information about possible access points. For example, an access point numbered 1 is provided by a provider P1, a region in which the access point is located is China, and an access address is "https://virtualbus.s3.cn north 1.amazonaws.com.cn". Remaining access points are deduced by analogy.

device 301, and is configured to connect to an access point, to connect to a virtual bus. The bus connector may be implemented by using hardware (for example, a communication interface or a transceiver), a software module, or a combination of the software module and a hardware module.

The bus connector is further configured to support device to implement a service between the device and the virtual bus. The device 301 implements a service such as bus registration, bus data publication, or bus message processing by using the bus connector. The bus registration means that the device registers itself with the virtual bus. The bus data publication is used to push metadata of data stored in the registered device to the virtual bus, and is also used to push data stored in a to-be-registered device to the virtual bus. After the data or the metadata is pushed to the virtual bus, the data or the metadata may be stored in an object storage resource pool of the virtual bus. The bus message processing is used by the device to complete a message-related function, for example, writing a message to a message queue in a form supported by the virtual bus, or reading a message in the message queue (described below).

When writing registration information, the device may write the registration information into the virtual bus in a specified format. The registration format may be a data format that is predefined, preconfigured, or specified in a protocol, the registration format may be a data format defined by a management service in the virtual bus, or the registration format may be a data format obtained through

TABLE 1

| List of information about the access points | | | |
| --- | --- | --- | --- |
| Number | Provider | Region | Access Address |
| 1 | P1 | China | https://virtualbus.s3.cn north 1.amazonaws.com.cn |
| 2 | P1 | Western USA | https://virtualbus.s3.us-west-2.amazonaws.com |
| 3 | P1 | Eastern USA | https://virtualbus.s3.us-east-3.amazonaws.com |
| 4 | P2 | — | https://virtualbus.obs.cn-north-4.myhuaweicloud.com |
| . . . | . . . | . . . | . . . |

The information about the access points may be provided to the device by using a trustlist. Optionally, the trustlist may be preconfigured or predefined in the device. For example, the trustlist t is configured in the storage device when the device is delivered from a factory. Alternatively, optionally, the device may obtain the trustlist from a specified address.

After obtaining the information about the access points, the device is connected to the access point by using a connection functional module. The connection functional module enables the device to connect to the virtual bus by using a compliant connection procedure, and execute a service (for example, the registration of the device with the bus, pushing of data to an object storage pool on the virtual bus, or receiving/sending of a message) related to the virtual bus. The connection functional module may be implemented by software, hardware, or a combination of the software and the hardware. The connection functional module usually includes one or more of an instruction for executing a bus connection procedure, a security certificate, a security context, a key, a connection protocol, and the like, and is configured to support the device in being connected to the virtual bus by using the compliant connection procedure.

Figure 3:
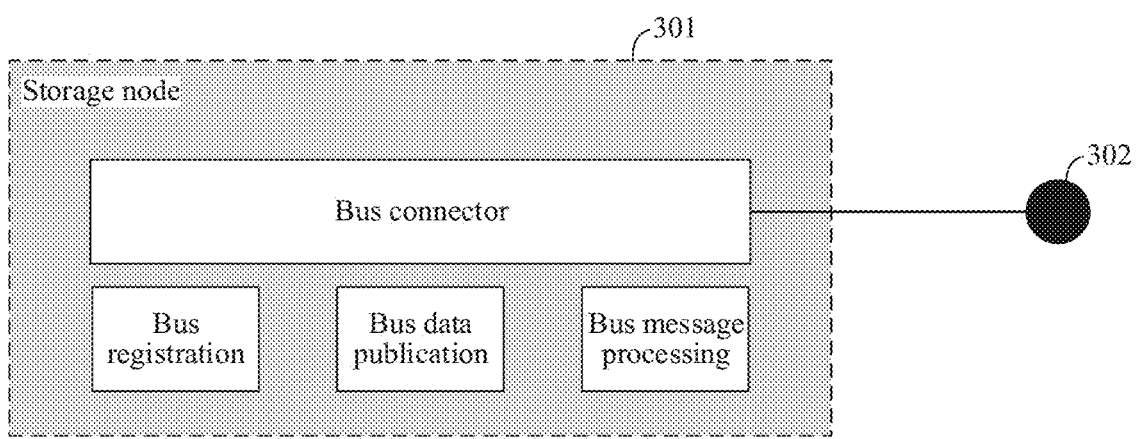
FIG. 3 is a schematic diagram of a device according to an embodiment of this application.

For example, FIG. 3 is a schematic diagram of a possible device according to an embodiment of this application. The device 301 (for example, the storage device shown in FIG. 1 or the service shown in FIG. 1) includes a bus connector. The bus connector is a connection functional module in the negotiation between the management service of the virtual bus and the storage device. For example, the registration format is key-value (KV) format. For another example, when the registration information is in the KV format, the device uses an identifier (for example, a UUID) of the device as a prefix of a key in the registration information. For example, Table 2 shows a possible registration information format by using an example in which the registration information is configuration information of the device. A key of the configuration information is a path of the configuration information, and a value is a value corresponding to the key. The key of the configuration information of the device is prefixed with a positioning address of the access point and the UUID of the device. As shown in the key in Table 2, {vbus_access_point} indicates a path through which the device connects to the access point, and {device-uuid} indicates the UUID of the device.

For example, the access point connected to the device is an access point numbered 1 shown in Table 1, and the UUID of the device is "cloud_0". A key of a name of the device is "https://virtualbus.s3.cn north 1.amazonaws.com.cn/ cloud_0/name", and a value is "shanghai-dorado88" (example). Similarly, a key of a model of the device is "https:// virtualbus.s3.cn north 1.amazonaws.com.cn/cloud_0/ model", and a value is "OceanStor Dorado" (example). During registration, the device uses a resource positioning address of the access point and the identifier of the device as the prefix.

13

TABLE 2

Configuration information of the device in the KV format

| Key | Value |
| --- | --- |
| https://{vbus_access_point}/{device-uuid}/name | shanghai-dorado88 |
| https://{vbus_access_point}/{device-uuid}/model | OceanStor Dorado |
| https://{vbus_access_point}/{device-uuid}/version | 6.5.3 |
| https://{vbus_access_point}/{device-uuid}/location | Pudong, Shanghai |
| https://{vbus_access_point}/{device-uuid}/management_ip | 10.2.2.88 |
| . . . | . . . |

For another example, Table 3 is a schematic table of possible metadata in the KV format by using metadata of a file system as an example. It may be learned that the key of the registration information is prefixed with the access point, a category (for example, a file system or a snapshot) of the data, and the identifier of the device. "{vbus_access_point}" indicates an access point into which a to-be-registered storage device writes the registration information, "filesystem" indicates that the category of the data is the file system, and "{fs-uuid}" is a unique identifier of the file system. Metadata "name of the data" is used as an example. The key is "https://{vbus_access_point}/filesystem/{fs-uuid}/name", and the value is "finance". Remaining metadata is deduced by analogy.

TABLE 3

Metadata in the KV format

| Key | Value |
| --- | --- |
| https://{vbus_access_point}/filesystem/{fs-uuid}/name | finance |
| https://{vbus_access_point}/filesystem/{fs-uuid}/shares/nfs/name | finance |
| https://{vbus_access_point}/filesystem/{fs-uuid}/shares/nfs/permission | rw |
| https://{vbus_access_point}/filesystem/{fs-uuid}/shares/nfs/IP | 10.2.2.9 |
| . . . | . . . |

In the foregoing examples, the to-be-registered device writes the registration information in the specified format. This embodiment of this application further provides another implementation. In this implementation, after uploading the registration information to the virtual bus, the device converts the registration information into a unified format by using another service (for example, a format conversion function provided by the virtual bus or a service provided by a services layer), and writes the registration information into the virtual bus. The converted format is the same as or similar to the foregoing preset format. Details are not described herein again.

The virtual bus includes storage space, and the registration information of the device may be stored in the storage space of the virtual bus. For example, the virtual bus provides the storage space by using an object storage service. The object storage service includes a plurality of object buckets. The path of the access point of the virtual bus is a directory of the object bucket, and the registration information of the device may be stored in the directory of the corresponding object bucket.

When the virtual bus provides the storage space by using the object storage service, all of the storage space of the virtual bus may be referred to as an object storage pool. The object storage service usually includes a plurality of object buckets, and the object buckets are the storage space provided by the object storage service. That is, the object storage pool may include a plurality of buckets provided by one or more object storage services.

Figure 4:
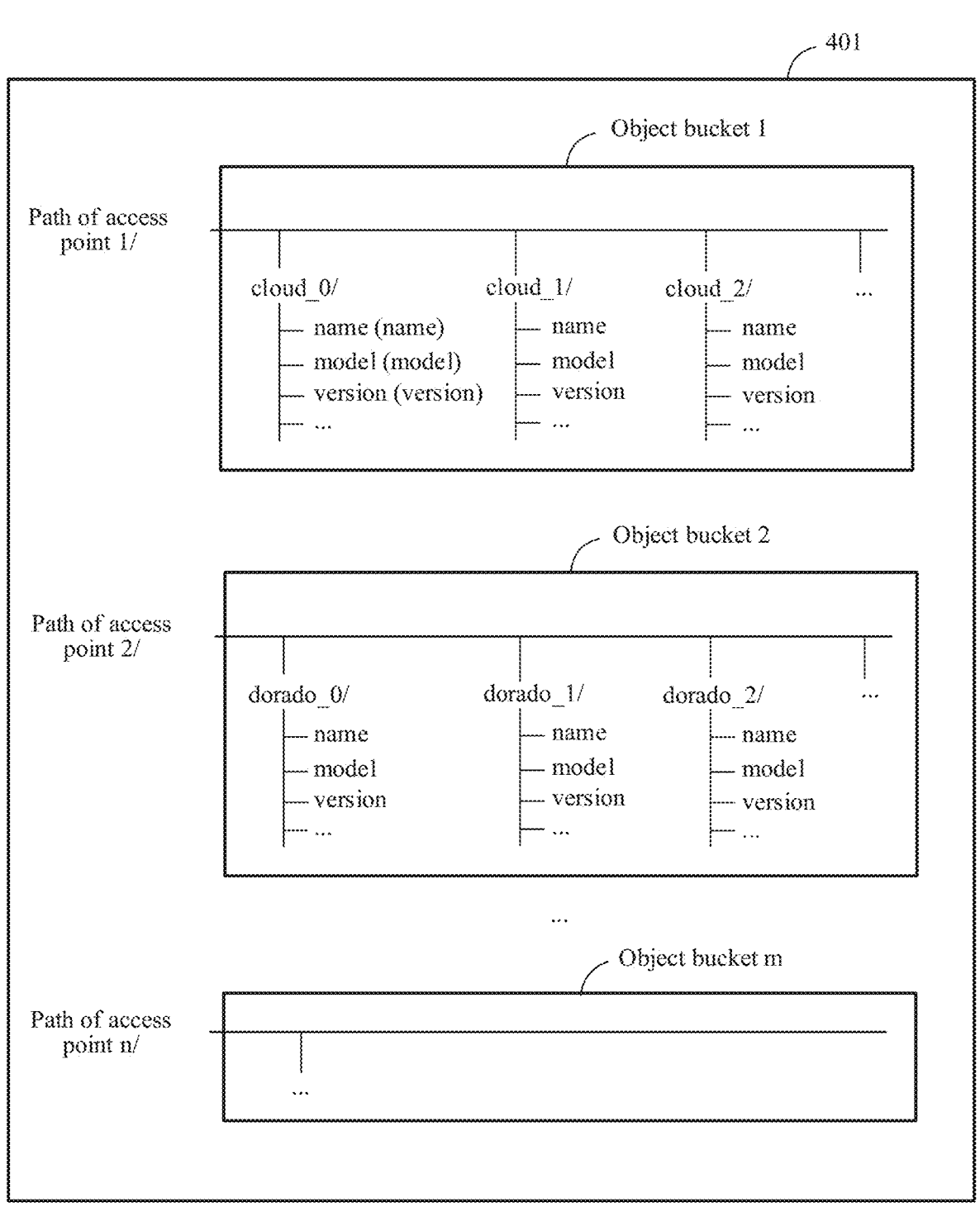
FIG. 4 is a schematic diagram of an object storage pool according to an embodiment of this application.

For example, FIG. 4 is a schematic diagram of a possible object storage pool. The object storage pool 401 includes m (m>0) object buckets, and a path of an access point 1 is a directory of an object bucket 1. There may be n (n>0) access points. For example, a registered device is cloud_0, and a registered access point is the access point 1. When cloud_0 is registered, registration information of cloud_0 is stored in the object bucket in a KV format, and a key is prefixed with "path of access point 1/cloud_0/". As shown in FIG. 4, a key corresponding to a name of the device cloud_0 is "access point address 1/cloud_0/name", and a value is written into storage space corresponding to the path. Similarly, configuration information, metadata, and the like of a device accessed via an access point 2 may also be written into a path of the access point 2. The foregoing object storage service may include an object storage service of a public cloud, an object storage service of a private cloud, an object storage service of a hybrid cloud, or the like. Alternatively, the object storage service may be deployed locally. For example, an enterprise establishes an offline object storage service by using a computing apparatus and a storage apparatus. When the virtual bus provides the storage space based on the object storage service of the public cloud, device virtual networks in a wide area can be covered based on global accessibility of the public cloud.

Figure 5:
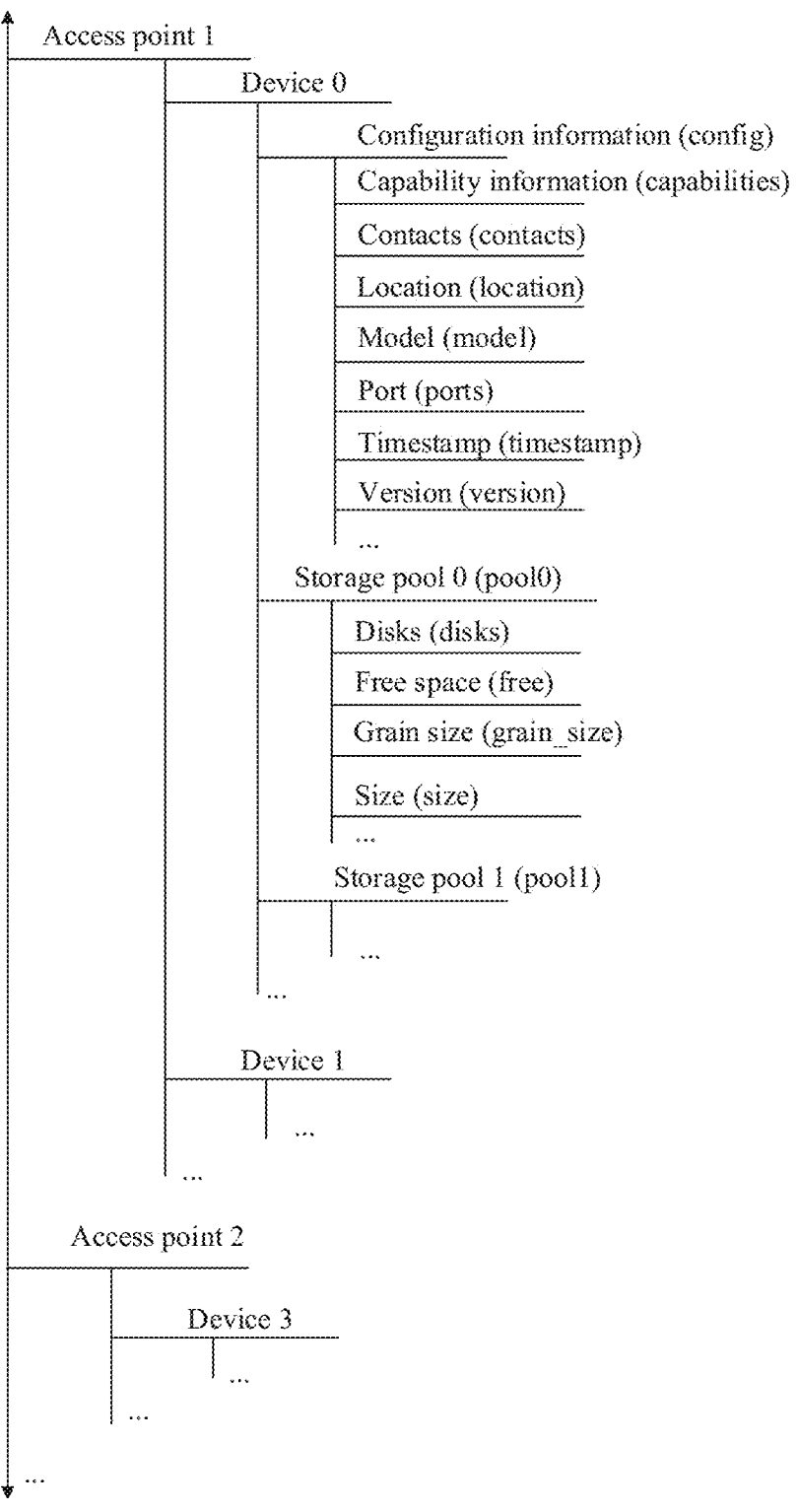
FIG. 5 is a schematic diagram of a view of a device on a virtual bus according to an embodiment of this application.

The virtual bus may provide a device discovery and sharing function. The device can discover another registered device through the virtual bus. For example, the device may discover, by scanning the access point, a device connected to the virtual bus via the access point. For example, FIG. 5 is a schematic diagram of a possible view of a device on a virtual bus according to an embodiment of this application. As shown in FIG. 5, a device scans an access point 1, to obtain information about a device that accesses a virtual bus via the access point 1. For example, the information about the device may include the foregoing registration information of the device.

To improve security and stability of a system, the virtual bus provides security protection by using a security service. For example, the security service may include security protection in one or more of the following three aspects.

In a first aspect, a permission is granted and revoked. The permission may include a query permission, an access permission, a communication permission (for example, a permission for sending a message to a specified device, or a permission for receiving a message from a device), a data push permission, and the like.

For ease of description, in a permission granting scenario, a party that requests the permission is referred to as a requester. In a possible implementation, in the security service, whether the permission is granted to the requester is determined based on a condition such as whether authentication of an identifier of the requester succeeds, or whether the requester purchases a related service.

For ease of understanding, the following exemplifies several cases in which the permission is granted and revoked.

Case 1: A discoverer needs to obtain access authorization before accessing a storage device and/or a service. For example, before accessing the storage device, the discoverer may request authentication information (for example, an access key) from the security service, and the discoverer may request to access the storage device based on the authentication information.

Case 2: When the discoverer does not need to use the permission, the discoverer should return the authorization. For example, after accessing the storage device, the discoverer may return the requested access key to the security service.

Case 3: The security service can revoke the granted permission. For example, the security service may revoke the granted authentication information, or the security service may invalidate the issued access key.

In a second aspect, access to data or information in the virtual bus is controlled by using an access control list (ACL). Specifically, the ACL is an access control technology based on condition screening, and may screen a request of the device for one piece of data based on a specified condition, to pass or discard the request.

FIG. 2 is used as an example. The ACL is established for the registration information of the storage device 1 in the virtual bus, and only a user satisfying a specified condition can read the registration information of the storage device 1. When the storage device 2 requests to read the registration information of the storage device 1, the ACL may check the read request of the storage device 2 based on the specified condition. When the read request of the storage device 2 satisfies the specified condition, the storage device 2 is allowed to read the registration information of the storage device 1.

In a possible implementation solution, the ACL may alternatively be in a unit of a single object. For example, control over access to an IP address in registration information of a storage device is implemented by using the ACL.

In a third aspect, the security service may encrypt data stored in the virtual bus in the KV format, to further ensure security of the data. Further, an encrypted key may be managed by using a key service. The key service may be integrated in the security service, or may be an independent key service.

In this embodiment of this application, the virtual bus may receive the registration of the device. The registered device may be discovered by another device based on the virtual bus. The virtual bus may be regarded as an intermediary to implement indirect connection between devices, so that a plurality of devices can discover and communicate with each other without direct interconnection.

It should be understood that, in some examples of this application, for ease of understanding, the storage device is used as an example to describe the device registration, the device discovery, and data mobility between the devices, and is not intended to limit a usage object of the virtual bus. Functions such as registration, discovery, and data mobility in this application are also applicable to a service, software, and the like.

In embodiments of this application, the storage devices, the services, and the like connected to the virtual bus may be heterogeneous. For example, hardware models, software versions, vendors, locations, file systems, or the like of the storage devices may be different from each other, and content, forms, architectures, or the like of the services may be different from each other. The heterogeneous devices may also be connected to each other by using a layout specification provided by the virtual bus, to establish a loosely coupled and distributed data collaboration relationship.

Figure 6:
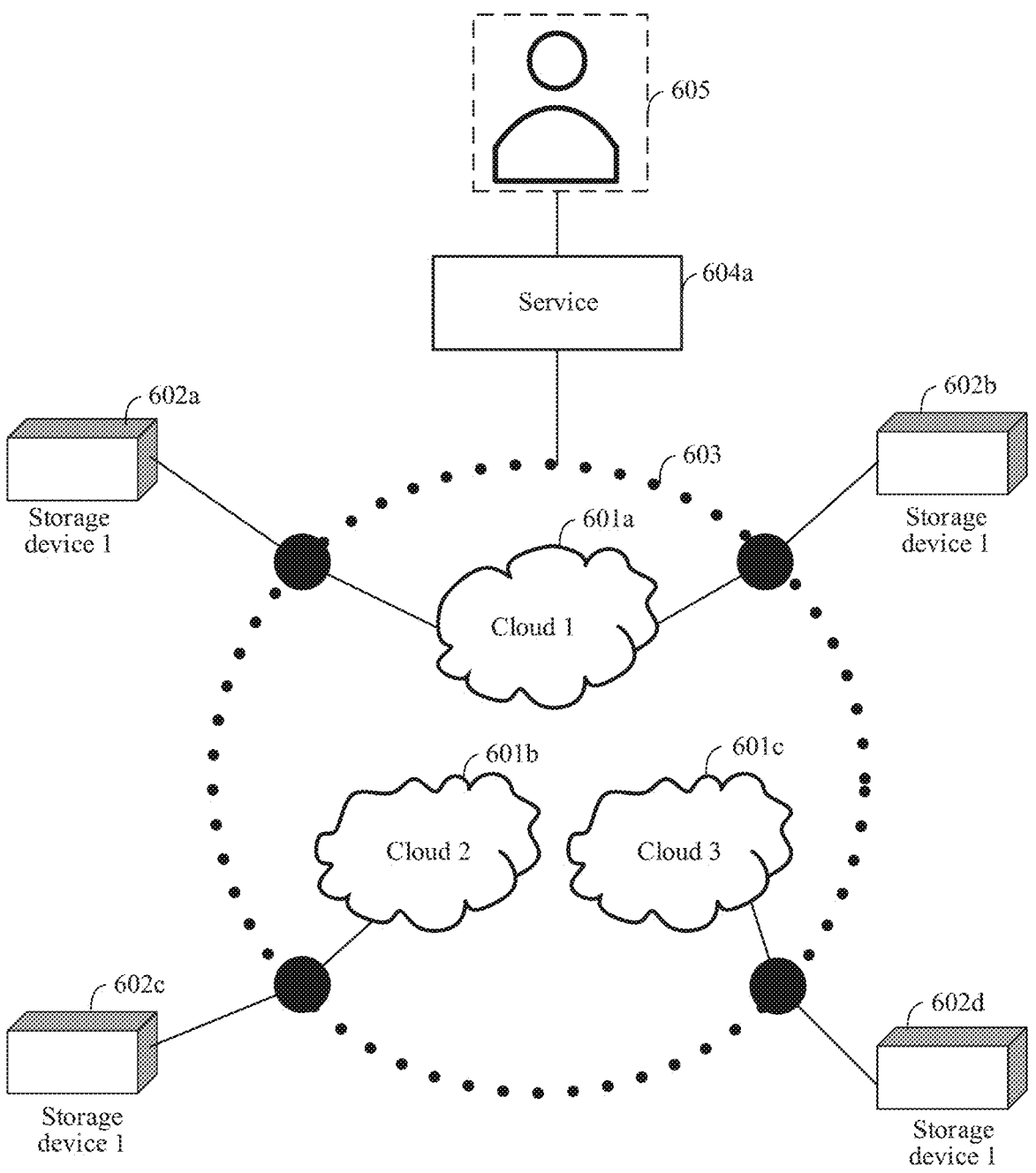
FIG. 6 is a schematic diagram of an application scenario of a data processing system according to an embodiment of this application.

For example, FIG. 6 is a schematic diagram of an application scenario of a possible data processing system according to an embodiment of this application. A storage device at a storage layer may perform device registration with a virtual bus 603, and the registered storage device may be discovered by another device. The storage device at the storage layer may include an online storage device such as a cloud 601a, a cloud 601b, or a cloud 601c, and may further include an offline physical device such as a storage device 602a, a storage device 602b, a storage device 602c, or a storage device 602d.

Optionally, there may be one or more online storage devices at the storage layer. When there are a plurality of online storage devices, the plurality of online storage devices may come from different providers. For example, the cloud 601a may be Huawei Cloud, the cloud 601b may be Amazon Cloud, and the cloud 601c may be Alibaba Cloud.

Similarly, there may be one or more offline storage devices at the storage layer. When there are a plurality of offline storage devices, regions, organizations, and providers of the plurality of offline storage devices may be the same or different. For example, the storage device 602a may be a massive storage service OceanStor, the storage device 602b may be a massive storage service OceanStor Cube, the storage device 602c may be a massive storage service OceanStor Pacific, and the storage device 602d may be a massive storage service OceanStor Dorado.

The service layer may provide a service based on the virtual bus 603. For example, the service at the service layer may include a service 604a. For descriptions of the service at the service layer, refer to the descriptions of the service layer in FIG. 2.

In a possible implementation, the service 604a may be implemented by using a data management engine (DME). The DME may be configured to present a global view, set a device status, manage data mobility between devices, or the like. Further, when the service 604a is the DME, the DME may be managed by an administrator 605. For example, the DME 604a responds to an input, an operation, or the like of the administrator 605, and executes a corresponding service. It should be understood that the administrator 605 herein may be a person, or may be a management service implemented by using a management device, a computer program, or the like.

In the scenario shown in FIG. 6, in a hybrid multi-cloud scenario, a user may have a plurality of storage devices, which may be distributed in different regions or in different clouds. However, in this embodiment of this application, the plurality of storage devices may be connected to each other through the virtual bus, to satisfy a connection requirement of a user for devices in different regions and different architectures.

The architecture of the virtual bus is described above, and some possible functions provided by the virtual bus are described below. Essentially, the virtual bus virtualizes a storage service and a message service. After virtualization processing, the storage service is used to store registration information, data, and the like, and the message service is used to implement communication between devices, to form a virtual network that includes an available storage resource and an available message service resource.

In a possible solution, the function of the virtual bus may be implemented by using the following four exemplary designs.

In a design 1, the virtual bus can store data by using an object storage service. There may be one or more types of object storage services, and may even include a plurality of types of object storage services from a plurality of providers. In an optional solution, the object storage service may include one or more of AWS S3 provided by Amazon, Huawei OBS provided by Huawei, Azure Blob provided by Microsoft, or the like.

Storage space provided by the object storage service may form an object storage pool. As shown in FIG. 2, the object storage pool may be configured to store information about an access point, registration information of a device, data pushed by a storage device, metadata of the data, or the like.

The object storage service provides persistent object storage. Therefore, content stored in the storage pool is persistent, and may be kept in the object storage pool. When the device is accessible and a permission is allowed, a user of the virtual bus may check the content stored in the object storage pool through the virtual bus at any time, for example, discover another device.

For example, FIG. 7 is a schematic diagram of a possible device directory of a virtual bus according to an embodiment of this application. After a device cloud_0 is registered, registration information of the device cloud_0 is stored in the virtual bus by using the directory shown in FIG. 7, and the directory shown in FIG. 7 is persistent. In the directory shown in FIG. 7, cloud_0 is a UUID of the device, and configuration information of the device is under the directory proc. For example, the configuration information may include information such as capabilities, contacts, information related to internet protocol version 4 (ipv4), information related to internet protocol version 6 (ipv6), a location, a model, ports, or a version. "capabilities" includes data describing a function of the device, for example, a communication capability, a storage capability, a type of a supported file system, and the like of the device. "contacts" includes a user maintaining the device or information about the device, for example, a contact number of a device administrator corresponding to the device, a physical address, and an IP address. The ipv4 and ipv6 shown in FIG. 7 are used to store a related file, a key, and the like of a communication protocol.

When the device includes the storage pool, the registration information may include information about the storage pool. As shown in FIG. 6, the information about the storage pool in the device is under the directory pool0. For example, the information may include information (namely, a disk) about a disk (disks) configured to obtain the storage pool, free space of the storage pool, a grain size of a disk slice, a size of the storage pool, or the like.

The registration information shown in FIG. 7 is persistently stored in a resource storage pool. The user of the virtual bus may read (or write or edit) information under the directory or write related information at any time through a path when the device is accessible and the permission is allowed. For example, after the registration information of the device is stored in the directory shown in FIG. 7, the discoverer may access the registration information of the device through the path. For example, a path for the discoverer to access contacts may be https://{vbus_access_point}/cloud_0/proc/contacts, and other information may be deduced by analogy.

In some scenarios, because the content information stored in the storage pool is persistent, when the configuration of the device changes, the device may not be accessed by using the original registration information. Therefore, in some cases, the content stored in the storage pool may be updated, or additional information is added for the discoverer (where the discoverer refers to a user of another virtual bus other than a discovered target device) to determine timeliness of the stored content.

In a possible design, an online status (for example, information such as a timestamp and update time) related to the device, for example, a heartbeat protocol, is periodically or aperiodically written, so that the discoverer may determine, based on the online status, whether the target device is still in an active state.

For ease of understanding, the following lists three possible solutions of the online status.

Solution 1: The online status is time for the device to previously update a status (or information) of the device. It should be understood that the time herein may be a moment, a timestamp, a time length, or the like.

FIG. 8 is a schematic diagram of a possible online status according to an embodiment of this application. It may be learned from an area 801 that previous update time of the storage device 1 is 15:50:00 on Oct. 12, 2021. Similarly, previous update time of a storage device 2 is "five minutes ago", and previous update time of the storage device 3 is "1634025000", where "1634025000" is a timestamp representation method, and may correspond to 15:50:00 on Oct. 12, 2021.

In the solution 1, the discoverer may determine, based on time for the target device to previously update a status of the target device, whether the target device is in an active state.

For example, if the time for the target device to previously update the status of the target device is within preset first duration (where for example, the first duration may be half an hour, one hour, or one day), the target device is in the active state. For example, if the first duration is one hour, and the previous update time of the storage device 2 is five minutes ago, falling within a range of the first duration, the storage device 2 is in the active state.

For another example, if the time for the target device to previously update the status of the target device is within preset second duration, the target device is in an inactive state. For example, the second duration is more than 24 hours. The previous update time of the storage device 1 is "2021.10.12 15:50:00". If current time is "2021.10.14 10:00:00", the storage device 1 is in the inactive state.

It should be understood that only two active states are used as examples above for description. During specific implementation, more or fewer types may be set, and examples are not provided one by one herein. Setting of the online status of the storage device is also applicable to a service. As shown in FIG. 8, a service at a service layer may also correspond to the update time, which is used by the discoverer to determine whether the service is in the active state.

Solution 2: The online status may be an identifier indicating whether the device is online or indicating a connection status of the device. For example, the identifier is online, offline, or connecting. FIG. 9 is a schematic diagram of a possible online status according to an embodiment of this application. It may be learned from an area 901 that the online status that may correspond to the storage device 1 is "online". Similarly, the online status corresponding to the storage device 2 is "offline".

Solution 3: The discoverer may determine, by sending an inquiry message to the target device and receiving a response message from the target device, whether the target device is still in the active state. Optionally, the inquiry message may be implemented by using a message mechanism. Further, optionally, the message mechanism may be predefined or preconfigured.

In a possible solution, an inactive device or an offline device may correspond to different management policies or communication policies. For example, if the device is in the inactive state, the device may be marked in a data view. For another example, if the device is in the offline state, a management service may be used to remind an administrator to restore the device to the online state.

In some scenarios, the discoverer determines a communication policy for the target device based on the online status of the target device. FIG. 9 is used as an example. If the target device with which the discoverer wants to communicate is the storage device 1, and the online status of the storage device 1 is "online", the discoverer may communicate with the storage device 1. If the target device with which the discoverer wants to communicate is the storage device 2, because the online status of the storage device 2 is "offline", the discoverer cannot communicate with the storage device 1 in this case. If the target device with which the discoverer wants to communicate is the storage device 3, because the online status of the storage device 3 is "connecting", the discoverer may view the online status of the target status again after a period of time.

Optionally, some public background services may also periodically scan the bus and clear old and inactive registration information.

In a design 2, the virtual bus may provide a metadata service to define a format of metadata or convert the registration information of the device into a data format.

In an optional solution, the management service of the virtual bus includes the metadata service. During registration, the device may upload original registration information to the metadata service, and the metadata service converts the original registration information of the device into registration information in a fixed format, and writes the registration information into an access point.

Optionally, the metadata service may be implemented by using a storage resource and a computing resource that are of the virtual bus, or may be implemented by using an independent service. When the metadata service is implemented by using the independent service, the metadata service is a service at the service layer.

In a design 3, the virtual bus may provide a data tunnel to implement data mobility between a plurality of devices that are not directly connected to each other.

The system shown in FIG. 2 is used as an example. When the storage device 1 is a transmit end, and the storage device 2 is a receive end, the storage device 1 may push data to a specified location, and the storage device 2 may obtain the data from the specified location.

The specified location may be a predefined location, a location negotiated by the transmit end and the receive end, a location indicated by the receive end, or the like. In a possible solution, storage space of the virtual bus may include pre-divided cache space, which is used as a location for temporarily storing the data. In this case, the transmit end may push the data to a location in the cache space, and the receive end fetches the data from the cache space.

In a design 4, the virtual bus provides the message service, and the plurality of devices may communicate a message by using the message service provided by the virtual bus. The message service may be implemented by using the storage resource and the computing resource that are of the virtual bus, or may be implemented by using an independent storage resource and computing resource. When the message service is implemented by using the independent storage resource and computing resource, the message service may be a service at the service layer.

For ease of understanding, two possible implementations are listed as follows.

In an implementation 1, the message service is provided by using a message queuing service. The message queuing service includes the storage resource and the computing resource, and may implement one or more of the following functions: storing a message queue, receiving a written message, notifying a message receiver to obtain the message, and the like. One message queue is used to store one or more messages. Optionally, the message in the message queue may be actively written by the device, or may be triggered when an operation is performed. For example, the storage device, the service, or the like in the virtual bus may actively write the message into the message queue. For another example, the message may be triggered when the user of the virtual bus operates (where the operation is, for example, adding, deleting, editing, or searching for) an object in the virtual bus. The message may be recorded in the message queue.

The message queuing service may be used to implement a plurality of types of message queues, including, for example, a control message queue, a notification message queue, or a broadcast message queue.

The data processing system shown in FIG. 2 is used as an example. When the storage device 1 is the transmit end, and the storage device 2 is the receive end, when data moves between the storage device 1 and the storage device 2, one or more message queues provided by the message queuing service may be used. A first message queue and a second message queue are used as an example below for description. The first message queue is used to store a message sent to the storage device 1, and the message queue 2 is used to store a message sent to the storage device 2. It should be understood that the first message queue and the second message queue may be a same message queue, or may be different message queues.

When the data moves, the storage device 2 writes a request message into the first message queue. The request message requests the storage device 1 to push data. The message queuing service may notify the storage device 1 to read the message. Correspondingly, the storage device 1 obtains the request message by reading the first message queue, to push the data to the specified location. After pushing the data, the storage device 1 may write a data prepared message into the second message queue. The message queuing service may notify the storage device 2 to read the message. Correspondingly, the storage device 2 reads the second message queue to obtain the data prepared message, to fetch, at the specified location, the data pushed by the storage device 1. In this way, a data mobility process is completed by using the message queuing service and the virtual bus.

In an implementation 2: the message queue is implemented based on the storage space of the virtual bus, or the message queue is stored in the storage space of the virtual bus. The message queue may include one or more messages. The message in the message queue may be actively written by the device, or may be triggered when an operation is performed. Optionally, the message receiver obtains the message by periodically or aperiodically reading (or listening to) the message queue.

In a possible implementation, the message queue is stored in the object storage pool of the virtual bus in the KV format. Further, a key of the message queue may have a fixed format, and the format may be predefined or preconfigured. For example, the key of the message queue may include a specified key prefix. The data processing system shown in FIG. 2 is used as an example. A prefix of a key of a message queue of the storage device 1 may be https://{vbus_access_point}/cloud_0/sys/message/, where "{vbus_access_point}" is the path of the access point connected to the device cloud0, "cloud_0" is the UUID of the storage device 1, "sys" is the directory in which the system file of the storage device 1 is located, and "message" is the location of the message queue under the directory sys. It should be understood that the UUID, the file name, and the like herein are merely examples, and do not limit a storage location of the message queue. For example, "message" may alternatively be replaced with another name, for example, "cli".

FIG. 10 is a schematic diagram of a possible directory of content stored in a storage pool. For example, an area 1001 shows a storage location of a message queue related to the device cloud0. As shown in FIG. 10, "path of access point 1/cloud_0/sys/message/request/dorado_0/1" indicates a request message related to the device cloud0, a sender of the message is a device whose UUID is "dorado_0", and a number of the request message is 1. For another example, "path of access point 1/cloud_0/sys/message/response/dorado_0/1" indicates a response message sent by the device cloud0, a receiver of the response message is the device whose UUID is "dorado_0", and the response message is a response to the request message whose number is 1.

In the implementation 2, the device may obtain, by periodically or aperiodically reading the message queue, a message that needs to be processed. This manner may be implemented based on the object storage service, and no message queuing service needs to be established. This manner has good independency.

The data processing system shown in FIG. 2 is used as an example. When the storage device 1 (where the UUID of the storage device 1 is, for example, "cloud_0") is a transmit end, and the storage device 2 (where the UUID of the storage device 2 is, for example, "dorado_0") is a receive end, the storage device 2 writes a request message (where a number of the request message is 1) into a request message queue of the storage device 1. The request message indicates to request the storage device 1 to push data. FIG. 10 is used as an example. A key of the request message written by the storage device 2 is "path of access point 1/cloud_0/sys/message/request/dorado_0/1". The storage device 1 may obtain the request message by reading the request message queue, that is, reading content stored in the path "path of access point 1/cloud_0/sys/message/request", to push data to a specified location.

After pushing the data, the storage device 1 may write a data prepared message into a response message queue. FIG. 10 is used as an example. A key of the data prepared message is "path of access point 1/cloud_0/sys/message/response/dorado_0/1". The storage device 2 may obtain the data prepared message from the response message queue, to fetch, at the specified location, the data pushed by the storage device 1. In this way, a data mobility process is completed by using the virtual bus.

The foregoing two implementations merely use data mobility between the storage devices as an example to describe the data mobility process, and are not intended to limit mobility of the data between only the storage devices. In a specific implementation process, the virtual bus may further support data mobility between services or between the storage device and the service. For data mobility manners in the two scenarios, refer to a data mobility manner between the devices. Details are not described herein.

In conclusion, the data mobility through the virtual bus is implemented in a push-pull manner. The transmit end pushes the data to the specified location, and the receive end fetches (downloads) the data from the specified location. The virtual bus controls a sequence of the data mobility by using the message service.

FIG. 11 is a schematic flowchart of a possible data processing method according to an embodiment of this application. In the embodiment shown in FIG. 11, a data output party is referred to as a transmit end, and a data input party is referred to as a receive end. The transmit end may be devices of a same type, or may be devices of different types. To be specific, a data mobility process shown in FIG. 11 may specifically be data mobility between storage devices, may be mobility between the storage devices and services, or may be mobility between the services and the services.

This method may be applied to the data processing system shown in FIG. 2. The data processing method shown in FIG. 11 includes step S1101 to step S1105.

Step S1101: The receive end obtains an indication of a message queue of the transmit end of data.

The receive end is a destination point of the data, and the transmit end is a source of the data. FIG. 2 is used as an example. When data in the storage device 1 needs to be migrated to the storage device 2, the storage device 1 is the transmit end, and the storage device 2 is the receive end. For another example, when data stored by a user in the storage device 1 needs to be sent to the service 1 for data analysis, the storage device 1 is the transmit end, and the service 1 is the receive end.

In this embodiment of this application, there may be one or more receive ends and transmit ends. For example, the storage device 1 may copy the data to the storage device 2, the storage device 3, and the storage device 4. In this case, the storage device 1 is the transmit end, and the storage device 2, the storage device 3, and the storage device 4 are all receive ends.

The message queue of the transmit end is used to record a message about the transmit end. There may be one or more message queues. When the transmit end has a plurality of message queues, the plurality of message queue may belong to different categories of message queues.

In a classification manner, based on different message sending directions, the message queues of the transmit end may include a request message queue, a response message queue, and the like. The request message queue is used to store a message sent by another device to the transmit end, and the response message is used to store a message sent by the transmit end to the another device.

In another classification manner, based on different quantities of message receivers, the message queues may include a point-to-point message queue, a multicast message queue, a broadcast message queue, and the like. The quantity of receivers of messages in the point-to-point message queue is usually 1, receivers of messages in the multicast message queue belong to one communication group (where there may be a plurality of receivers, one receiver, or no receiver in the communication group), and receivers of messages in the broadcast message queue are all receivers within a range. It should be understood that the range herein may cover an entire virtual bus, or cover some devices obtained through pre-division of the virtual bus.

In still another possible classification manner, based on different functions of messages, the message queues may include a control message queue, a data message queue, and the like. The indication of the message queue is used to mark a message queue. The indication of the message queue may include a number of the message queue, an ID of the message queue, a path of the message queue, or a URL of the message queue. The receive end may find the message queue of the transmit end based on the indication of the message queue.

For example, the virtual bus provides a message queuing service. The message queue service stores message queues respectively corresponding to a plurality of devices, and distinguishes different message queues based on IDs of the message queues. The receive end may obtain the ID of the message queue of the transmit end from the message queuing service based on the virtual bus.

For example, a resource storage pool of the virtual bus stores a message queue corresponding to a device. A resource storage pool shown in FIG. 10 is used as an example. If the transmit end is a device whose UUID is "cloud_0", the indication of the message queue of the transmit end may be "path of access point 1/cloud_0/sys/message/".

In a possible design, the indication of the transmit end message queue may be included in metadata. The receive end scans an access point from the virtual bus, and may obtain metadata of the access point, to obtain the indication of the message queue of the transmit end. For example, as shown in FIG. 10, the receive end scans an access point 1, and may obtain metadata of the access point, to obtain an indication of a message queue of the device whose UUID is "cloud_0".

Step S1102: The receive end device adds a data push request to the message queue.

Specifically, the receive end may add a new message to the message queue based on the indication of the message queue. The receive end needs to obtain the data of the transmit end. Therefore, the receive end may add the data push request to the message queue.

When the transmit end uses the message queuing service to store the message queue, the receive end device may add, based on the indication of the message queue, the data push request to the message queue of the transmit end by using the message queuing service.

When the transmit end uses storage space of the virtual bus to store the message queue, the transmit end device may add, based on the indication of the message queue, the data push request to a path corresponding to the message queue. The resource storage pool shown in FIG. 10 is used as an example. When the transmit end is the device whose UUID is "cloud_0", the receive end may add the data push request to the path "path of access point 1/cloud_0/sys/message/request". For example, when the receive end is a device whose UUID is "dorado_0", the data push request (for example, with a number 1) may be specifically added to the "path of access point 1/cloud_0/sys/message/request/dorado_0/1".

It may be understood that the transmit end writes the data push request into the message queue, and the receive end may obtain the data push request through the message queue.

For example, when the message queuing service is used to store the message queue, the message queuing service may notify, by using a doorbell mechanism, the transmit end that there is a message to be read. Correspondingly, the transmit end may obtain the data push request from the message queue.

For another example, when the storage space of the virtual bus is used to store the message queue, the transmit end may periodically or aperiodically read the message queue of the transmit end, to obtain the data push request. This manner may also be referred to as a polling mechanism. To be specific, the transmit end periodically or aperiodically reads the message queue in turn, to find an unprocessed message.

In a possible solution, the receive end may include the bus connector shown in FIG. 3, and the receive end implements a message-related service by using the bus connector. For example, by using the bus connector, the receive end writes the data push message into the message queue in a predefined format or according to a communication protocol, reads a message in the message queue, and the like.

Similarly, the transmit end may alternatively include the bus connector shown in FIG. 3. For example, by using the bus connector, the transmit end reads a message in the message queue, writes a data prepared message into the message queue, and the like.

Step S1103: The transmit end pushes the data to a specified location in response to the data push request.

The specified location provides storage space for storing the data pushed by the transmit end. The specified location may be described by using a path, a URL, or the like.

The specified location may be in the storage space of the virtual bus. For example, the specified location may be in the resource storage pool of the virtual bus. FIG. 12 is a schematic diagram of a possible directory in a storage pool. An object storage pool 1201 includes k (k>0) object buckets, where an object bucket 1, an object bucket m, and the like are used to store registration information, and the like, and an access point k is used to cache data. For example, the transmit end is the device whose UUID is "cloud_0", and the receive end is the device whose UUID is "dorado_0". The specified location may be the following path: "object bucket number m/temp_0/cloud_0/data_1". In this case, the transmit end may push the data to storage space corresponding to the path for storage.

Certainly, the specified location may alternatively be another storage location located in a non-virtual bus.

When pushing the data, the transmit end first determines a specified location of the data to be pushed, and pushes the data to the specified location. Specifically, the transmit end may determine, in the following manners, the specified location of the data to be pushed.

Manner 1: The specified location may be a preconfigured or predefined storage location. For example, the storage space is pre-divided in the object storage pool of the virtual bus, to cache the data pushed by the transmit end.

Manner 2: The transmit end selects a segment of storage space from available storage locations as the specified location for caching the data.

Manner 3: The transmit end and the receive end negotiate with each other to obtain the specified location.

Manner 4: The receive end selects a segment of storage space from the available storage locations as the specified location for caching the data. Further, in this case, the receive end may include the specified location in the data push request, so that the transmit end can learn of, based on the data push request, a place to which the data is pushed.

Step S1104: The receive end obtains the data prepared message.

Specifically, the receive end may obtain the data prepared message by using the message queue. The message queue herein may be the response message queue, the point-to-point message queue, the multicast message queue, or the like of the transmit end.

FIG. 10 is used as an example. After pushing the data to the specified location, the transmit end may write the data prepared message (with the message number 1) into the following path "path of access point 1/cloud_0/sys/message/response/dorado_0". The receive end may periodically or aperiodically read the message queue in the path, to obtain the data prepared message.

For example, the message queuing service includes the broadcast message queue, and the receive end may receive a message in the broadcast message queue. After pushing the data to the specified location, the transmit end may write the data prepared message into the broadcast message queue. Correspondingly, the receive end obtains the data prepared message by reading the broadcast message queue.

For example, if the specified location is in the virtual bus, when pushing the data to the specified location, the transmit end automatically triggers the data prepared message. When the message queuing service is used to store the message queue, the virtual bus may remind, by using the message queuing service and in a form of the doorbell mechanism, the receive end to read the data prepared message. Correspondingly, the receive end may obtain the data prepared message.

Step S1105: The receive end obtains the data.

Specifically, the receive end may fetch (download) the data (or a data segment) from the specified location.

In a possible design, the transmit end may push the data in a form of a plurality of data segments. In this case, the transmit end writes a data prepared message each time a data segment is uploaded. The receive end separately receives the plurality of data segments by using a plurality of data prepared messages, and combines the segments to obtain complete data.

In another possible design, the transmit end may further perform on-demand fetching on the data in the specified location. The on-demand fetching means that the receive end starts to fetch only the metadata, fetch a part of the data, or fetch the metadata and the part of the data. When data that is not fetched needs to be used, a remaining part of the data or all the remaining data is fetched through the virtual bus.

In the embodiment shown in FIG. 11, the virtual bus may be considered as a data tunnel, and data mobility between devices may be implemented based on the virtual bus. A data mobility process may be controlled by using the message queue. When the message queuing service is used to control the message queue, the message queuing service may further actively remind the receiver to process the message, to shorten waiting time of the message and improve data mobility efficiency.

In a possible design, a device that initiates a data push request and a device that receives data may be different devices. For example, FIG. 13 is a schematic flowchart of another possible data processing method according to an embodiment of this application. The method includes step S1301 to step S1305. For detailed descriptions, refer to related descriptions of step S1101 to step S1105. A request end is a device that initiates a data push request, a transmit end is a data output party, and a receive end is a data input party.

In an instance shown in FIG. 13, the request end may obtain an indication of a message queue of the transmit end, and add the data push request to the message queue. Correspondingly, the transmit end may actively read the data push request from the message queue, or a message queuing service reminds the transmit end to read the data push request. After obtaining the data push request, the transmit end may push the data to a specified location.

After the data is pushed to the specified location, the receive end may actively read a data prepared message from the message queue, or the message queuing service reminds the receive end to read the data prepared message. The receive end may obtain the data from the specified location.

For ease of understanding, the following lists a possible data mobility process. In a possible design, an offline data center of an enterprise A has a snapshot of a file system. Currently, the enterprise A needs to push data in the file system to a virtual machine (VM) of a public cloud for data analysis. There is no network connection between an offline virtual machine and a cloud virtual machine VM, but both the offline virtual machine and the cloud virtual machine may access an object storage service of Huawei Cloud by using firewall configurations.

Step S01: The data center registers with a virtual bus. Registration information includes metadata of the snapshot of the file system.

For example, an access address of the metadata of the snapshot on the virtual bus is as follows: https://{vbus_access_point}/file/{fs_uuid}/snapshots/2021-09-07. {vbus_access_point} is an identifier of an access point, and {fs_uuid} is a unique identifier of the file system.

The metadata of the snapshot includes information about a message queue of the data center, for example, an address and a key of the message queue.

Step S02: The VM obtains bus access, and obtains the metadata through the virtual bus.

Optionally, after access to the data center is authorized, the VM may obtain the metadata of the snapshot registered by the data center.

Step S03: The VM learns of the message queue of the data center from the metadata of the snapshot.

Optionally, the data center may have one or more related message queues.

For example, the data center may include a control message queue and a notification message queue. The control message queue includes a message sent to the data center. The notification message queue includes a message sent by the data center. Optionally, for the message in the notification message queue, there may be one receiver (for example, point-to-point sending), or may be a plurality of receivers (for example, group sending or cluster sending).

For example, an address of information that is (which may include information such as metadata of the message queue, an address of the message queue, or a key of the message queue) about a possible control message queue and that is on the virtual bus may be as follows: https://{vbus_access_point}/file/{fs_uuid}/snapshots/2021-09-07/device/message_queue/ctrl-endpoint.

For example, information about a possible notification message queue may be as follows: https://{vbus_access_point}/file/{fs_uuid}/snapshots/2021-09-07/device/message_queue/broadcast-endpoint.

For example, information about a secret file of a possible message queue may be as follows: https://{vbus_access_point}/file/{fs_uuid}/snapshots/2021-09-07/device/message_queue/secrets.

Step S04: The VM sends a data push request to the control message queue.

Optionally, the data push request may include a location indication, specifying a cache location of the data in the bus.

For example, a possible location indication may be as follows:

https://{vbus_access_point}/file/{fs_uuid}/snapshots/2021-09-07/relay/buffer.

Step S05: The data center receives the data push request, and pushes the data to the specified location.

Optionally, the data center may periodically or aperiodically read the message queue, to obtain the data push request.

Alternatively, optionally, a message queuing service of the virtual bus may remind, in a form of a doorbell, the data center that there is a new message to be processed. Correspondingly, the data center may obtain the data push request.

Optionally, when pushing the data, the data center may push all of the data, or push the data for a plurality of times, and push a part of the data each time. An example in which the data center pushes the data for the plurality of times is used below for description. This is also applicable to a case in which all the data is pushed at a time.

Step S06: Each time the data center completes sending a part of the data, the data center sends a notification to the notification message queue.

Specifically, the data center may actively write a data prepared message into the notification message queue.

Step S07: The VM receives the data prepared message by using the notification message queue, and downloads a data segment.

Optionally, the VM may periodically or aperiodically read the message queue, to obtain the data prepared message.

Alternatively, optionally, the message queuing service of the virtual bus may remind, in the form of the doorbell, the VM that there is a new message to be processed. Correspondingly, the VM may obtain the data prepared message.

The data center and the VM may perform step S06 and step S07 for a plurality of times, so that the VM receives required data.

Step S08: The VM performs data analysis based on the received data.

In this way, through the virtual bus, the data may move between an offline device and an online device that are of the enterprise A and that are not directly connected to each other, and an additional data tunnel does not need to be constructed. Therefore, costs for maintaining and managing the data tunnel can be reduced, and data mobility efficiency can be improved.

It should be understood that, in the foregoing device registration, device discovery, and data mobility processes, devices connected to each other through the virtual bus are all located within a security boundary of an enterprise or organization, and the security boundary herein may be a security protection service, for example, a firewall. The virtual bus does not send data to or read any information from a device or service connected to the virtual bus. Therefore, a firewall of the device or service does not affect normal operation of the virtual bus. Object storage and the message queue that are in the virtual bus are used to only store the data. Each device or service connected to the virtual bus reads data from the virtual bus or writes data into the virtual bus based on a service requirement of the device or service, to implement interconnection and data transmission in a loose coupling manner.

Therefore, the virtual bus is used to perform interconnection, so that interconnection between data may be implemented, the data moves in a non-direct connection form, and the security boundary of each device or service is not damaged. Therefore, data security of the device and service within the security boundary can be ensured.

In some possible designs, a virtual bus may aggregate metadata of a device, metadata of data, or the like, to provide global views of the device and the data. Information such as the metadata of the device and the metadata of the data may indicate a plurality of types of valuable content related to the data, for example, how to access the data, a storage location (for example, an object bucket, an access point, or an access prefix) of the data on the bus, specific devices that current share the data, and information about a message queue.

In some possible designs, the information or content may be collected by a management service (or a device that manages the virtual bus), and is used to present a data-centric data management view. For example, in the data processing system shown in FIG. 5, the service 604a may view the data and the metadata in the virtual bus by using the DME, and generate a data-centric data management view. For example, the management view may be presented in a form shown in FIG. 4. Based on the data management view, an administrator may determine the storage location of data on the bus, the related message queue, and the like.

In a possible solution, in the data-centric data management view, information such as a hotness degree of the data may be marked, to facilitate data sharing and data security.

Further, a management device may select a subset of a service based on a requirement of the service, to establish a federated file system (a data plane).

Optionally, the file system may be a file system established for a specific application scenario or a specific use requirement.

From a perspective of a life cycle, a life cycle of the data is different from that of the device. In most cases, the life cycle of data is longer. For example, when the device is faulty or retired, the data needs to be migrated to another device. With the data-centric management view, the device may be used as a medium for storing the data, and provide a channel (Access Point) for data access. In addition, the two functions "medium for storing the data" and "providing a channel for data access" may alternatively be separated from each other.

For example, the following three designs may be implemented with the data-centric management view.

In a design 1, the file system is independent of the device, and does not belong to any device.

The file system is distinguished by using identity information of the file system, and the identity information of the file system may be an ID, a number, and the like of the file system. The identity information of the file system is globally unique, and is also referred to as a unique identifier of the file system. For example, a UUID may be used to uniquely identify the file system.

Usually, when the file system is created, the unique identifier of the file system is defined and cannot be changed.

In a design 2, the file system has at least one device as a primary copy, and the primary copy may be changed. For example, FIG. 2 is used as an example. When the storage device 1 (an original primary copy) is retired, the file system may be migrated to the storage device 2. In this case, the device 2 may serve as a new primary copy.

In a design 3, the file system has at least one device providing an access point. In the federated file system, a plurality of devices can provide a plurality of access points for related devices to access the file system.

It should be understood that the device that provides the access point may not have a complete data copy, and data may be streamed (streaming), as required, from any device that has a data copy of the file system. The metadata of the file system indicates specific devices that currently have a complete copy of the data. For any device, a mount point of the file system on the device may be unified as {device}/{uuid}.

A device in which a current primary copy of the file system is located is referred to as a primary file system (Primary FS). There may be a plurality of primary file systems, for example, an active-active file system. A file system that does not include an access point of the complete data is referred to as a shadow file system (Shadow FS). Any device has two types of file systems: the primary file system and the shadow file system.

There is a correspondence between the shadow file system and the primary file system. Usually, for a shadow file system, a corresponding primary file system may be found by using global metadata.

In an environment with the virtual bus, the file system is registered with the bus by using the UUID as the identifier, and another shadow file system may obtain a primary device by querying records of the bus to complete a service procedure.

Nodes (which may be a cluster) of the federated file system may share and obtain the metadata through the virtual bus. A target node may not care about a place in which a source file system is located and a device that provides the source file system, and may obtain required data based on the metadata to access the file system. A data layout of the file system provides a format of the metadata on the bus, so that participants of a global file system can update the metadata in an orderly manner to complete file collaboration between a plurality of stations.

In a possible scenario, storage space in a storage device of a user may be large. In this case, the large storage space is registered as an object, efficiency during access and reading is affected, and a requirement of the user cannot be satisfied.

For example, there may be a plurality of blocks in a storage center of an enterprise. These blocks are distinguished by using LUNs. One LUN may correspond to one or more blocks. When the plurality of blocks need to be registered with a virtual bus, mapping of one LUN to one object cannot satisfy the requirement of the user. An embodiment of this application provides a flexible mapping method to implement block-to-object mapping, so as to support requirements of various services of the enterprise.

Specifically, a block is limited linear space. The block may have a plurality of configuration types, for example, a thin provision block or a fully allocated block. The thin provision block is sparse linear space. A fully allocated block device may actually form sparse linear space by removing an interval of all zeros. In consideration of logic of a snapshot, a plurality of pieces of sparse space are associated with each other.

In a possible solution, a linear address of a LUN may be mapped to an object. For example, each piece of 4 MB space in the block is mapped to an object. A key of the object includes a prefix, a LUN UID (unique ID), a logical block addressing (LBA) address, and the like. Optionally, the LBA address may also be replaced with an LBA address obtained by shifting the LBA address right by N bits, where N is an integer. For example, N may be 22.

To support the snapshot, an ID of the snapshot may be added between the LUN UID and address. Data of the snapshot is combination of data of a snapshot 0 to a current snapshot. In this case, access to the data is accelerated by creating a mapping table for each snapshot. The mapping table is a separate file for one-time download. To facilitate creation of the mapping table, when the data of each snapshot is uploaded, a bitmap of the data of the current snapshot may be uploaded. A simple bitmap file includes only data modified by the current snapshot.

For example, FIG. 14 is a possible schematic diagram of mapping a block to an object according to an embodiment of this application. A key of each object file includes a prefix, a LUN UID, and an LBA. The LBA is shown in 1401. A value is space obtained through segmenting, and a size is 4 MB.

It should be understood that 4 MB is merely an example, and there may be another segment size in an actual process. Further, a segment may be alternatively determined based on a service, an input/output (I/O) size, and the like, to satisfy a requirement of a user as much as possible.

However, when a segment size is used, services that do not satisfy various input/output (I/O) sizes occur. For example, if the segment size is 4 MB, the following problem may occur: A user modifies a sector but has to upload the entire segment. To resolve the preceding problem, a mapping table (where a size of the mapping table is less than 4 MB) is added to a header of each segment. In this way, actual content of each segment is less than 4 MB. This increases a mapping table of a snapshot. The mapping table in the header of the segment is also easily extended to support compression and deduplication. To support a cascading snapshot (a writable snapshot), base data is placed under the LUN UID or a root directory of the snapshot. A mapping table of snapshot data needs to trace a parent directory to a level at which the LUN UID is located.

In another possible solution, log space including a plurality of small files is established in an object storage. The small file includes one or more pieces of fixed physical space. The log space formed in this way may be infinitely increased.

The small file may use a log segment address as a key. When the compression and the deduplication are supported, an actual size of the small file is less than the segment size. In essence, an address mapping of the small file may be regarded as a mapping from a fixed-size linear space (logical address) of the LUN to linear space (a physical address) at a persistence layer. The LUN is mapped in a form of "index+log".

The log is used to retain written historical data and support an I/O-level snapshot. Newly written data may be uploaded after the data is accumulated to the segment size.

The log retains the written historical data. This may cause wastes of storage space and bandwidth. A public cloud computing resource may be used to perform garbage collection for the log space, to reduce the wastes of storage space and bandwidth. For example, a preset policy is used to combine logs in a period of time, to generate increments of consecutive time segments. For example, all I/Os in the last 15 minutes are retained, combination is performed every minute after 15 minutes, combination is performed every five minutes after half an hour, combination is performed every hour after 1 hour, and combination is performed every day after one day.

The index also needs to be mapped to an object storage service (for example, S3) via a checkpoint or based on the log. An independent log may be created for the writable snapshot. A start point of the log is not 0, but a latest physical address of a source LUN at a moment at which the snapshot is generated. This address is read from the source LUN, and read from a LUN of the snapshot.

It should be understood that, during specific usage, historical data of this level is not required in all application scenarios. Such a log-based solution may provide additional benefits in terms of real-time file collaboration across clouds.

An embodiment of this application further provides a computing node. The computing node includes a processor and a memory. The memory stores at least one computer instruction. The instruction is loaded and executed by the processor, to implement the method operation performed by the foregoing virtual bus.

An embodiment of this application further provides a storage device. The storage device includes a processor and a memory. The memory stores at least one computer instruction. The instruction is loaded and executed by the processor, to implement the method operation performed by the foregoing storage device or storage layer.

This application further provides a computer-readable storage medium. The computer-readable storage medium stores instructions. When the instructions are run on at least one processor, the foregoing data processing method, for example, the method in FIG. 11, is implemented.

This application further provides a computer program product. The computer program product includes computer instructions. When the instructions are executed by a computing device, the foregoing data processing method, for example, the method in FIG. 11, is implemented.

In embodiments of this application, the word such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word "example", "for example", or the like is intended to present a related concept in a specific manner.

In embodiments of this application, "at least one" means one or more, and "a plurality of" means two or more. "At least one item (piece) of the following" or a similar expression thereof means any combination of these items, including a singular item (piece) or any combination of plural items (pieces). For example, at least one item (piece) of a, b, or c may represent: a, b, c, (a and b), (a and c), (b and c), or (a, b, and c), where a, b, and c may be singular or plural. The term "and/or" describes an association relationship between associated objects, and indicates that three relationships may exist. For example, A and/or B may indicate the following three cases: Only A exists, both A and B exist, and only B exists. A and B may be singular or plural. A character "/" usually indicates an "or" relationship between the associated objects.

In addition, unless otherwise specified, ordinal numbers such as "first" and "second" used in embodiments of this application are used to distinguish a plurality of objects, and are not used to limit a sequence, a time sequence, a priority, or an importance degree of the plurality of objects. For example, a first message queue and a second message queue are merely for ease of description, but do not indicate differences in structures, importance, and the like between the first message queue and the second message queue. In some embodiments, the first message queue and the second message queue may alternatively be a same device.

Based on the context, the term "when" used in the foregoing embodiments may be interpreted as a meaning of "if", "after", "in response to determining", or "in response to detecting".

A person of ordinary skill in the art may understand that all or some of the steps in the foregoing embodiments may be implemented by hardware or a program instructing related hardware. The program may be stored in a computer-readable storage medium. The storage medium may be a read-only memory, a magnetic disk, an optical disc, or the like.

What is claimed is:

1. A data processing system, comprising:
a plurality of storage devices, and a virtual bus, wherein
the plurality of storage devices are configured to provide storage space;
the virtual bus is configured to receive a registration of the plurality of storage devices; and wherein
the plurality of storage devices are connected to the virtual bus, and the plurality of storage devices are not directly connected to each other, and the plurality of storage devices exchange data or transfer a message to each other through the virtual bus;
wherein the plurality of storage devices exchange data through the virtual bus comprises: a transmit end of the plurality of storage devices is configured to push data to a pre-divided cache space of the virtual bus, and a receive end of the plurality of storage devices is configured to fetch the data from the pre-divided cache space; and
wherein the plurality of storage devices transfer a message to each other through the virtual bus comprises: the plurality of storage devices transfer a message to each other through a message queue of the virtual bus, and the message queue is configured to store the message transferred between the plurality of storage devices.

2. The system according to claim 1, wherein the plurality of storage devices comprise one or more of a storage array, a storage server, a public cloud, a private cloud, or a hybrid cloud.

3. The system according to claim 1, wherein one of the plurality of storage devices is configured to submit registration information to the virtual bus.

4. The system according to claim 3, wherein the registration information comprises device information of the storage device.

5. The system according to claim 3, wherein the registration information comprises metadata of data.

6. The system according to claim 3, wherein the registration information comprises information about a storage pool.

7. The system according to claim 3, wherein the registration information satisfies a preset data format.

8. The system according to claim 3, wherein the one of the plurality of storage devices is configured to submit the registration information to the virtual bus after obtaining authorization.

9. The system according to claim 1, wherein the virtual bus further comprises a message queue, and the message queue is configured to store a message about at least one of the plurality of storage devices.

10. The system according to claim 9, wherein
the message queue is configured to record a data push request from the receive end, and the data push request requests the transmit end to push target data;
the transmit end is configured to push the target data to a preset location in the pre-divided cache space; and
the message queue is configured to record a data preparation message related to the receive end, and the data preparation message notifies the receive end to fetch the target data from the preset location.

11. A data processing method, comprising:
receiving, by using a virtual bus, a registration of a plurality of storage devices, wherein the plurality of storage devices are configured to provide storage space, wherein the plurality of storage devices are connected to the virtual bus, the plurality of storage devices are not directly connected to each other, the plurality of storage devices exchange data or transfer a message to each other through the virtual bus;
pushing, by a transmit end of the plurality of storage devices, data to a pre-divided cache space of the virtual bus; and
fetching, by a receive end of the plurality of storage devices, the data from the pre-divided cache space; and wherein the plurality of storage devices transfer a message to each other through the virtual bus comprises: the plurality of storage devices transfer a message to each other through a message queue of the virtual bus, and the message queue is configured to store the message transferred between the plurality of storage devices.

12. The method according to claim 11, wherein the plurality of storage devices comprise one or more of a storage array, a storage server, a public cloud, a private cloud, or a hybrid cloud.

13. The method according to claim 11, wherein the method further comprises:

submitting, by one of the plurality of storage devices, registration information to the virtual bus.

14. The method according to claim 13, wherein the registration information comprises device information of the storage device.

15. The method according to claim 13, wherein the registration information comprises metadata of data.

16. The method according to claim 13, wherein the registration information comprises information about a storage pool.

17. The method according to claim 13, wherein the registration information satisfies a preset data format.

18. The method according to claim 13, wherein the method further comprises:

submitting, by the one of the plurality of storage devices, the registration information to the virtual bus after obtaining authorization.

\* \* \* \* \*